(12) United States Patent  
Cannock

(10) Patent No.: US 8,870,996 B2
(45) Date of Patent: Oct. 28, 2014

(54) MINERAL COMPLEX, COMPOSITIONS THEREOF, AND METHODS OF USING THE SAME

(76) Inventor: Justin Cannock, Scottsdale, AZ (US)

( * ) Notice: Subject to any disclaimer, the term of this patent is extended or adjusted under 35 U.S.C. 154(b) by 456 days.

(21) Appl. No.: 13/085,170

(22) Filed: Apr. 12, 2011

(65) Prior Publication Data

US 2011/0247273 A1    Oct. 13, 2011

Related U.S. Application Data

(60) Provisional application No. 61/323,139, filed on Apr. 12, 2010, provisional application No. 61/352,464, filed on Jun. 8, 2010.

(51) Int. Cl.
| | |
|---|---|
| C05D 9/02 | (2006.01) |
| C05F 11/00 | (2006.01) |
| C05B 17/00 | (2006.01) |
| C05D 9/00 | (2006.01) |
| A01N 25/00 | (2006.01) |
| C09K 17/08 | (2006.01) |
| C05D 3/00 | (2006.01) |
| C09K 8/02 | (2006.01) |

(52) U.S. Cl.
CPC . *C09K 17/08* (2013.01); *C05D 3/00* (2013.01); *C09K 8/02* (2013.01)
USPC ............ 71/23; 71/11; 71/20; 71/31; 71/64.05

(58) Field of Classification Search
USPC .................................................. 71/34–64.13
See application file for complete search history.

(56) References Cited

U.S. PATENT DOCUMENTS

| | | | |
|---|---|---|---|
| 3,657,423 A | 4/1972 | Yacowitz | |
| 5,106,405 A | 4/1992 | Goto | |
| 5,143,481 A | 9/1992 | Schumacher et al. | |
| 5,605,557 A | 2/1997 | Hall | |
| 5,743,935 A | 4/1998 | Hall | |
| 5,912,398 A * | 6/1999 | Goldstein et al. .................. 71/6 |
| 6,357,177 B1 | 3/2002 | Hirose | |
| 6,524,489 B1 | 2/2003 | Palm et al. | |
| 6,887,828 B2 | 5/2005 | Allen et al. | |

(Continued)

FOREIGN PATENT DOCUMENTS

| | | | |
|---|---|---|---|
| DE | 2045648 A1 | 4/1972 | |
| EP | 0099106 A2 | 1/1984 | |
| WO | WO 2006/009354 A1 | 1/2006 | |
| WO | WO 2007022760 A2 * | 3/2007 | .............. C05F 11/08 |

OTHER PUBLICATIONS

"FCRD" Fertilizer & Soil Conditioner. http://www.fcrd.com.au/organic.htm Jan. 6, 2009.*

(Continued)

*Primary Examiner* — Jennifer A Smith
(74) *Attorney, Agent, or Firm* — Leydig, Voit & Mayer, Ltd.

(57) ABSTRACT

The invention provides inter alia a mineral complex comprising about 40 wt. % to about 60 wt. % $SiO_2$, about 6 wt. % to about 16 wt. % $Fe_2O_3$, about 4 wt. % to about 12 wt. %. CaO, about 2 wt. % to about 8 wt. % MgO, wherein at least 85% of the mineral complex has a particle size of about 10 to about 6000 mesh, related compositions and methods for their use, including for growth medium augmentation and remediation.

48 Claims, 3 Drawing Sheets

(56) References Cited

U.S. PATENT DOCUMENTS

| | | | |
|---|---|---|---|
| 7,008,663 | B2 | 3/2006 | Jung et al. |
| 7,195,770 | B2 | 3/2007 | Gitomer et al. |
| 2002/0197295 | A1* | 12/2002 | Stein et al. .................. 424/405 |
| 2004/0028630 | A1 | 2/2004 | Gitomer et al. |
| 2005/0186305 | A1 | 8/2005 | Rosenberg et al. |
| 2006/0117655 | A1 | 6/2006 | Bodycomb et al. |
| 2006/0130397 | A1 | 6/2006 | Huw et al. |
| 2007/0095118 | A1* | 5/2007 | Evers et al. .................. 71/28 |
| 2009/0117206 | A1 | 5/2009 | Carpenter et al. |
| 2009/0130702 | A1 | 5/2009 | Goldstein |
| 2009/0148589 | A1 | 6/2009 | Fox et al. |
| 2009/0280046 | A1 | 11/2009 | Reddy et al. |
| 2010/0000444 | A1 | 1/2010 | Constantz et al. |
| 2010/0092618 | A1 | 4/2010 | Jobe et al. |

OTHER PUBLICATIONS

Coles, D. G., et al., Chemical studies of stack fly ash from a coal fired power plant. ES&T vol. 13(4)(1979)455-459.*

"A Rock Dust Primer" http://remineralize.org.joomla (Retrieved Jun. 18, 2009).

Alexopoulos et al., *Livestock Science*, 111(3), 230-241 (Sep. 2007).

Azomite® Typical Analysis, http://azomite.com/typical analysis.html (Mar. 17, 2007).

"Clinoptilolite" from Wikipedia, http://en.wikipedia.org/wiki/clinoptilolite (Retrieved May 14, 2009).

*Mineral Tolerance of Animals*, 2$^{nd}$ Revised Ed., pp. 13-14, National Research Council (2005).

"Soil Amendments for Remediation, Revitalization, and Reuse Tools: Fact Sheet" U.S. Environmental Protection Agency (EPA 540-R-07-013) (Nov. 2007).

"Fertiliser & Soil Conditioner," Fishers Creek Rock Dust, www.fcrd.com.au/nutrients.htm (Retrieved Jun. 24, 2009).

Homeyer, Henry, "On a Fad Diet of Rock Dust, How the Garden Does Grow," New York Times (Jun. 24, 2004).

Lynch, Kira, and Sandra Novotny "Green Remediation: Opening the Door to Field Use (Exercise in Applying Strategies)" *National Association of Remedial Project Managers, 18$^{th}$ Annual Training Conference* (Jul. 7-11, 2008).

"Green Remediation: Best Management Practices for Excavation and Surface Restoration," U.S. Environmental Protection Agency, Office of Solid Waste and Emergency Response (5102G) (Dec. 2008).

Pathan et al., *J. Environ. Qual.*, 32, 687-693 (2003).

Remin, Re Mineralise Earth, www.remin.com.au (2007).

Straková et al. *Acta Veterinaria Brno*, 77, 199-207 (2008).

Willis, Paul, "Rock Dust" www.abc.net.au/catalyst/stories (Aug. 23, 2001).

International Search Report, PCT/US2011/032110 (Aug. 17, 2011).

International Search Report, PCT/US2011/038750 (Sep. 14, 2011).

U.S. Appl. No. 13/085,135, filed Apr. 12, 2011.
U.S. Appl. No. 13/085,192, filed Apr. 12, 2011.
U.S. Appl. No. 13/085,180, filed Apr. 12, 2011.
U.S. Appl. No. 13/085,226, filed Apr. 12, 2011.
U.S. Appl. No. 13/085,243, filed Apr. 12, 2011.
U.S. Appl. No. 13/150,795, filed Jun. 1, 2011.
U.S. Appl. No. 13/150,827, filed Jun. 1, 2011.
U.S. Appl. No. 13/150,858, filed Jun. 1, 2011.
U.S. Appl. No. 13/150,876, filed Jun. 1, 2011.
U.S. Appl. No. 13/150,895, filed Jun. 1, 2011.

Boudergue et al., "Review of mycotoxin-detoxifying agents used as feed additives: mode of action, efficacy and feed/food safety," published by the European Food Safety Authority (EFSA) on Dec. 8, 2009.

Coles et al., *Environ. Sci. & Technol.*, 13(4): 455-459 (1979).

Nanzyo, *Global Environmental Research (English Edition)*, 6(2): 99-112 (2002).

* cited by examiner

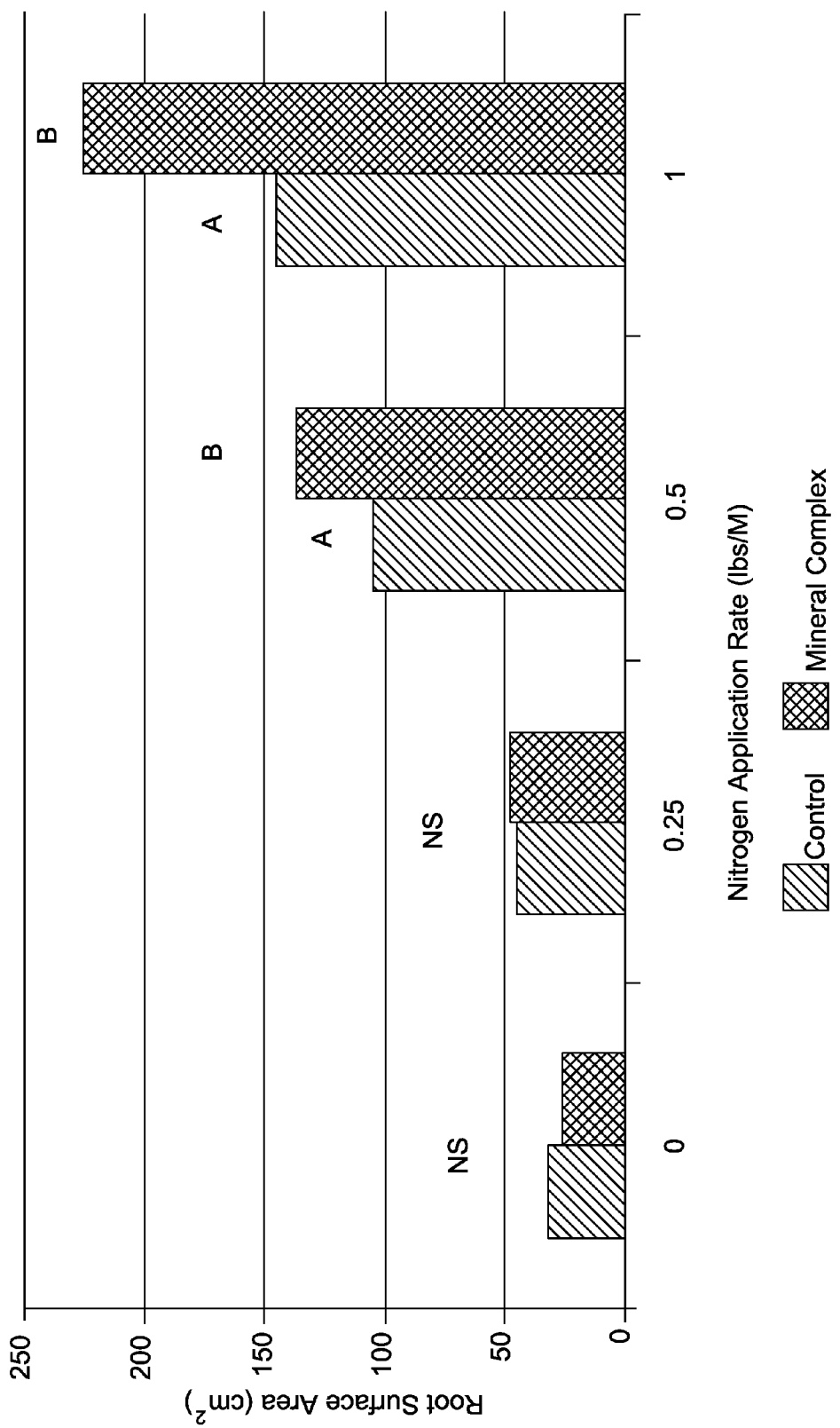

MINERAL COMPLEX, COMPOSITIONS THEREOF, AND METHODS OF USING THE SAME

CROSS-REFERENCE TO RELATED APPLICATIONS

This patent application claims the benefit of U.S. Provisional Patent Application No. 61/323,139, filed Apr. 12, 2010, and U.S. Provisional Patent Application No. 61/352,464, filed on Jun. 8, 2010, which are incorporated by reference.

BACKGROUND OF THE INVENTION

Growth media, which includes soil and water, are essential for nutrient-dense production of a variety of cultivars, such as those suitable for human and livestock feed. In addition to providing a stable base that supports plant roots and above-soil plant mass, soils store water and nutrients required for plant growth via a series of inter-related mechanisms. Water also provides support for several varieties of plants, as well as nutrients necessary for growth.

Expanding industrial agriculture practices and dramatically changing weather patterns continue to damage and deplete the soil matrix. Intensive plowing and monocrop agriculture systems result in nutrient depletion and wide-scale soil erosion, and the over-application of fertilizers, herbicides and pesticides contaminate soils and pollute waterways.

The runoff of fertilizers and pesticides, and the contamination of waterways from other sources, can cause the nutrient balance in these waterways to become less than optimal. In this condition, the waterways may not support plant growth therein.

Crop harvesting is itself a primary factor in soil and water depletion. Each harvest can result in a significant loss of nutrients and moisture from the soil. Without replenishment, the land rapidly degrades due to nutrient depletion, and crops become increasingly nutrient poor. Sustainable agriculture depends on replenishing the soil while minimizing the use of non-renewable resources, such as natural gas or mineral ores.

Other contaminants adversely impact water and soil growth media. Recent years have seen contamination due to weather (e.g., sodium and other salts deposited on the soil via sea water as a result of hurricanes, tropical storms, or tsunamis), accidents (e.g., oil spills during drilling or production), and industrial discharge. This contamination reduces the ability of the water and soil to support plant growth.

In an effort to address the deficiencies in soil, amendments have been developed which, when added to soil, improve plant growth and health. Generally speaking, an amendment is any material added to a soil to improve its physical, biochemical, or chemical properties. An amendment or a combination of amendments are often applied to the soil in an effort to address soil deficiencies.

In view of the foregoing, there exists a need for economically-viable materials which, when applied onto soil and water, address one or more of the foregoing issues. The present invention meets these and other needs by providing materials and compositions suitable for application onto soil and water, and related methods for their use.

BRIEF DESCRIPTION OF THE DRAWINGS

FIG. 3 is a bar graph depicting the root surface area ($cm^2$) for common bermudagrass grown in soil treated with various application rates of nitrogen (control) and soil treated with various application rates of nitrogen and the mineral complex (mineral complex).

BRIEF SUMMARY OF THE INVENTION

Figure 1:
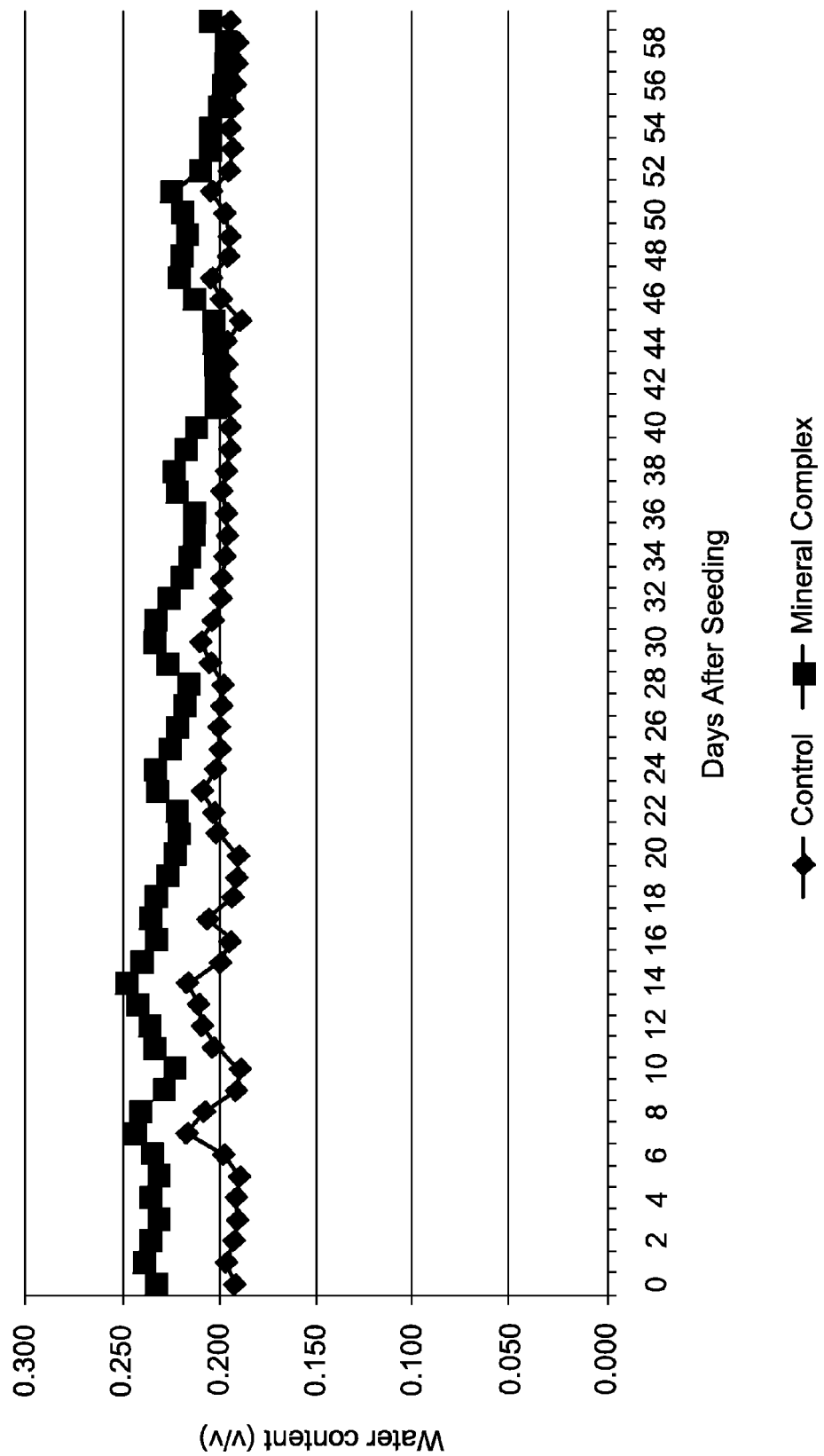
FIG. 1 is a line graph depicting the soil water content (v/v) for soil treated with 1.0 pound of nitrogen per 1,000 square feet (lb N/M) (control) and soil treated with 1.0 pound of nitrogen per 1,000 square feet (lb N/M) and the mineral complex (mineral complex).

In one aspect, the invention provides a mineral complex comprising about 40 wt. % to about 60 wt. % $SiO_2$, about 6 wt. % to about 16 wt. % $Fe_2O_3$, about 4 wt. % to about 12 wt. %. CaO, and about 2 wt. % to about 8 wt. % MgO.

In a related aspect, the invention provides a composition which comprises the foregoing mineral complex and at least one other component as described herein.

A further aspect of the invention provides a composition comprising a mineral complex comprising about 40 wt. % to about 60 wt. % $SiO_2$, about 6 wt. % to about 16 wt. % $Fe_2O_3$, about 4 wt. % to about 12 wt. %. CaO, and about 2 wt. % to about 8 wt. % MgO, and at least one of a seed, a binder, a fertilizing agent, mulch or water.

Another aspect of the invention provides a process for augmenting soil, water or sand comprising applying onto the soil, water or sand a mineral complex comprising about 40 wt. % to about 60 wt. % $SiO_2$, about 6 wt. % to about 16 wt. % $Fe_2O_3$, about 4 wt. % to about 12 wt. %. CaO, and about 2 wt. % to about 8 wt. % MgO, or a composition comprising the mineral complex, wherein the mineral complex (or composition which comprises the mineral complex) is applied onto the soil or sand in an amount sufficient to provide for the application thereto of the mineral complex in an amount ranging from about 200 lbs per acre to about 10,000 lbs per acre or, in the case of water applications, in an amount sufficient to provide for the application thereto of the mineral complex in an amount ranging from about 50 lbs to about 5000 lbs of the mineral complex per 5,000 square feet of surface area of water. The composition used in the aforesaid augmentation process may desirably also comprise one or more of seed, a binder, a fertilizing agent, mulch or water.

In another aspect, the invention provides a process for enhancing moisture retention in soil comprising applying onto the soil a mineral complex comprising about 40 wt. % to about 60 wt. % $SiO_2$, about 6 wt. % to about 16 wt. % $Fe_2O_3$, about 4 wt. % to about 12 wt. %. CaO, and about 2 wt. % to about 8 wt. % MgO, or a composition which comprises the mineral complex, wherein the mineral complex (or a composition comprising the mineral complex) is applied onto the soil in an amount sufficient to provide for the application thereto of the mineral complex in an amount ranging from about 200 lbs per acre to about 10,000 lbs per acre, and wherein the soil onto which the mineral complex (or composition) has been applied exhibits enhanced moisture retention relative to untreated soil.

In yet another aspect, the invention provides a process for enhancing the germination rate of a seed in a growth medium comprising implanting the seed in the growth medium and applying onto the growth medium a mineral complex comprising about 40 wt. % to about 60 wt. % $SiO_2$, about 6 wt. % to about 16 wt. % $Fe_2O_3$, about 4 wt. % to about 12 wt. %.

CaO, and about 2 wt. % to about 8 wt. % MgO, or a composition which comprises the mineral complex.

Yet another aspect of the invention provides a process for mitigating erosion in soil comprising applying onto the soil a mineral complex comprising about 40 wt. % to about 60 wt. % $SiO_2$, about 6 wt. % to about 16 wt. % $Fe_2O_3$, about 4 wt. % to about 12 wt. %. CaO, and about 2 wt. % to about 8 wt. % MgO, or a composition which comprises the mineral complex, wherein the mineral complex has an average particle size from about 200 to about 6000 mesh, and wherein the mineral complex (or composition thereof) is introduced into the sand in an amount sufficient to provide for the application of the mineral complex in an amount ranging from about 200 lbs per acre to about 10,000 lbs per acre.

A further aspect of the invention provides a process for remediating soil having an elevated level of sodium (Na) relative to normal soil comprising applying onto the soil having an elevated level of sodium relative to normal soil a mineral complex comprising about 40 wt. % to about 60 wt. % $SiO_2$, about 6 wt. % to about 16 wt. % $Fe_2O_3$, about 4 wt. % to about 12 wt. %. CaO, and about 2 wt. % to about 8 wt. % MgO, or a composition comprising the mineral complex, wherein the mineral complex (or composition thereof) is applied onto the soil in an amount sufficient to provide for the application of the mineral complex in an amount ranging from about 200 lbs per acre to about 10,000 lbs per acre.

A related aspect of the invention provides a process for enhancing the ability of sodium-enriched soil to support vegetation comprising introducing into the soil a mineral complex comprising about 40 wt. % to about 60 wt. % $SiO_2$, about 6 wt. % to about 16 wt. % $Fe_2O_3$, about 4 wt. % to about 12 wt. %. CaO, and about 2 wt. % to about 8 wt. % MgO, or a composition comprising the mineral complex, wherein the mineral complex (or composition thereof) is applied onto the soil in an amount sufficient to provide for the application of the mineral complex in an amount ranging from about 200 lbs per acre to about 10,000 lbs per acre, and wherein the soil into which the mineral complex has been introduced exhibits enhanced vegetation relative to untreated soil.

The invention also provides a process for remediating contaminated soil comprising applying onto the soil a mineral complex comprising about 40 wt. % to about 60 wt. % $SiO_2$, about 6 wt. % to about 16 wt. % $Fe_2O_3$, about 4 wt. % to about 12 wt. %. CaO, and about 2 wt. % to about 8 wt. % MgO, or a composition comprising the mineral complex.

The invention also provides a method for remediating water contaminated by hydrocarbons (e.g., oil or oil-based materials) comprising applying onto the contaminated water a mineral complex comprising about 40 wt. % to about 60 wt. % $SiO_2$, about 6 wt. % to about 16 wt. % $Fe_2O_3$, about 4 wt. % to about 12 wt. %. CaO, and about 2 wt. % to about 8 wt. % MgO, or a composition comprising the mineral complex.

DETAILED DESCRIPTION OF THE INVENTION

The invention provides a mineral complex, and compositions comprising a mineral complex, that are useful as an amendment for growth media, for soil remediation, and related methods of use. The mineral complex is suitable for use on a variety of growth media, for example, soil (including sand, silt, clay, or combinations thereof) and water, and also is useful in amending such growth media, as well as remediating soil and water, as will be more fully described herein.

The mineral complex of the invention may be obtained from any natural mineral source. In this regard, the mineral complex of the invention is a natural product which may be used for the production of organic foods. In particular, the mineral complex of the invention meets Organic Materials Review Institute (OMRI) certification standards as organic/non-synthesized inputs: natural mineral deposits that are not chemically processed/altered. The mineral complex of the invention also qualifies as Generally Recognized As Safe (GRAS) status for food processing applications.

Desirably, the mineral complex of the invention is obtained from volcanic (mineral) deposits. For example, the mineral deposit may be located in non-porous naturally altered volcanic lava, from highly porous naturally altered volcanic ash, or the mineral complex may be prepared from a combination of non-porous naturally altered volcanic lava and highly porous naturally altered volcanic ash.

The mineral complex of the invention may be obtained from any source that extracts mineral deposits having the characteristics described herein. The mineral complex may be obtained from one source or from several different sources. For example, the mineral complex may be prepared from one natural source of mineral deposit having the characteristics described herein, or the mineral complex can be prepared by mixing together several different mineral deposits to achieve a mineral complex having the characteristics described herein. It should be further understood that when the mineral complex of the invention is obtained from a natural source, the mineral complex may vary in content from source to source and batch to batch. However, analyses of the mineral complex may be routinely performed in accordance with techniques known to those skilled in the art to ensure that the quality of the mineral complex is maintained from batch to batch and from source to source.

The mineral complex of the invention comprises numerous minerals and elements as described herein. Unless otherwise indicated by language or context, references to weight percents of the minerals and elements of which the mineral complex is comprised are based on the total weight of the mineral complex.

The component having the highest weight percent (wt. %) in the mineral complex is silicon dioxide ($SiO_2$). For example, the mineral complex may comprise about 40 wt. % to about 60 wt. %, about 42 wt. % to about 58 wt. %, about 45 wt. % to about 60 wt. %, about 45 wt. % to about 55 wt. %, about 45 wt. % to about 50 wt. %, about 46 wt. % to about 56 wt. %, about 47 wt. % to about 55 wt. %, about 47 wt. % to about 54 wt. %, about 48 wt. % to about 53 wt. %, about 49 wt. % to about 53 wt. %, about 51 wt. % to about 54 wt. %, about 51 wt. % to about 53 wt. %, about 46 wt. % to about 50 wt. %, about 46 wt. % to about 49 wt. %, or about 47 wt. % to about 49 wt. % $SiO_2$. Desirably, the mineral complex comprises less than 56 wt. % (e.g., about 45 wt. %, about 46 wt. %, about 47 wt. %, about 48 wt. %, about 49 wt. %, about 50 wt. %, about 51 wt. %, about 52 wt. %, about 53 wt. %, about 54 wt. %, or about 55 wt. %) $SiO_2$.

The mineral complex of the invention also may comprise an iron oxide (e.g., FeO, $Fe_2O_3$, or $Fe_3O_4$). For example, the mineral complex may comprise about 6 wt. % to about 16 wt. %, about 8 wt. % to about 16 wt. % (e.g., about 8 wt. %, about 9 wt. %, about 10 wt. %, about 11 wt. %, about 12 wt. %, about 13 wt. %, about 14 wt. %, about 15 wt. %, or about 16 wt %), about 8 wt. % to about 12 wt. %, about 9 wt. % to about 15 wt. %, about 10 wt. % to about 14 wt. %, about 9 wt. % to about 14 wt. %, about 10 wt. % to about 13 wt. %, about 12 wt. % to about 14 wt. %, or about 12 wt. % to about 16 wt. % FeO, $Fe_2O_3$, or $Fe_3O_4$.

The mineral complex of the invention also may comprise calcium oxide (CaO). For example, the mineral complex may comprise about 4 wt. % to about 12 wt. %, about 6 wt. % to about 12 wt. %, about 6 wt. % to about 11 wt. %. (e.g., about 6 wt. %, about 7 wt. %, about 8 wt. %, about 9 wt. %, about 10 wt. %, about 11 wt. %), about 6 wt. % to about 10 wt. %, about 7 wt. % to about 10 wt. %, or about 7 wt. % to about 9 wt. % CaO.

The mineral complex of the invention also may comprise magnesium oxide (MgO). For example, the mineral complex may comprise about 2 wt. % to about 8 wt. %, about 4 wt. % to about 8 wt. % (e.g., about 4 wt. %, about 5 wt. %, about 6 wt. %, about 7 wt. %, or about 8 wt. %), about 4 wt. % to about 6 wt. %, about 5 wt. % to about 8 wt. %, about 4 wt. % to about 7 wt. %, or about 5 wt. % to about 6 wt. % MgO.

It is contemplated that the foregoing ranges of each component of the mineral complex may be present in the mineral complex in any combination. For example, the mineral complex may comprise about 40 wt. % to about 60 wt. % $SiO_2$, about 6 wt. % to about 16 wt. % $Fe_2O_3$, about 4 wt. % to about 12 wt. %. CaO, and about 2 wt. % to about 8 wt. % MgO, or the mineral complex may comprise about 40 wt. % to about 60 wt. % $SiO_2$, about 12 wt. % to about 16 wt. % $Fe_2O_3$, about 7 wt. % to about 11 wt. %. CaO, and about 2 wt. % to about 8 wt. % MgO. Additional exemplary mineral complexes may comprise about 47 wt. % to about 54 wt. % $SiO_2$, about 9 wt. % to about 15 wt. % $Fe_2O_3$, about 6 wt. % to about 10 wt. % CaO, and about 4 wt. % to about 7 wt. % MgO; about 48 wt. % to about 53 wt. % $SiO_2$, about 10 wt. % to about 14 wt. % $Fe_2O_3$, about 6 wt. % to about 9 wt. % CaO, and about 4 wt. % to about 6 wt. % MgO; about 49 wt. % to about 53 wt. % $SiO_2$, about 9 wt. % to about 12 wt. % $Fe_2O_3$, about 7 wt. % to about 9 wt. % CaO, and about 5 wt. % to about 6 wt. % MgO; or about 47 wt. % to about 49 wt. % $SiO_2$, about 12 wt. % to about 15 wt. % $Fe_2O_3$, about 8 wt. % to about 10 wt. % CaO, and about 5 wt. % to about 7 wt. % MgO.

Preferably, the mineral complex comprises about 47 to about 49 (about 48) wt. % $SiO_2$, about 13 to about 15 (about 14) wt. % $Fe_2O_3$, about 8 to about 10 (about 9) wt. % CaO, and about 5 to about 7 (about 6) wt. % MgO. In another embodiment, the mineral complex comprises about 49 to about 51 (about 50) wt. % $SiO_2$, about 12 to about 14 (about 13) wt. % $Fe_2O_3$, about 8 to about 10 (about 9) wt. % CaO, and about 5 to about 7 (about 6) wt. % MgO. In yet another preferred embodiment, the mineral complex comprises about 52 to about 54 (about 53) wt. % $SiO_2$, about 9 to about 11 (about 10) wt. % $Fe_2O_3$, about 6 to about 8 (about 7) wt. % CaO, and about 4 to about 6 (about 5) wt. % MgO.

The mineral complex of the invention also may further comprise aluminum oxide ($Al_2O_3$). Preferably, the mineral complex may comprise less than about 16 wt. % $Al_2O_3$ (e.g., about 15.5 wt. % or less). For example, the mineral complex may comprise about 9 wt. % to about 15 wt. % (e.g., about 10 wt. %, about 11 wt. %, about 12 wt. %, about 13 wt. %, about 14 wt. %, about 15 wt. %), about 12 wt. % to about 15 wt. %, about 13 wt. % to about 15 wt. %, about 14 wt. % to about 15 wt. %, or about 13.5 wt. % to about 15.5 wt. % $Al_2O_3$. The mineral complex of the invention also may further comprise sodium oxide ($Na_2O$). For example, the mineral complex comprises about 1 wt. % to about 4 wt. % or about 2 wt. % to about 3 wt. % (e.g., about 2 wt. %, about 2.5 wt. %, or about 3 wt. %) $Na_2O$.

In one embodiment of the invention, the mineral complex comprises about 46 wt. % to about 50 wt. % $SiO_2$, about 12 wt. % to about 14 wt. % $Fe_2O_3$, about 8 wt. % to about 10 wt. % CaO, about 5 wt. % to about 7 wt. % MgO, about 14 wt. % to about 16 wt. % $Al_2O_3$, and about 1 wt. % to about 4 wt. % $Na_2O$.

Desirably, the mineral complex also may comprise at least one or more rare earth elements (e.g., at least two, at least three, at least four, or at least five). As defined by IUPAC, rare earth elements (which include for purposes of the invention that which may be referred to as rare earth metals) are a collection of seventeen chemical elements in the periodic table, namely scandium (Sc), yttrium (Y), and the fifteen lanthanoids: lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). The rare earth elements are also referred to as light rare earth elements (lanthanum, cerium praseodymium, neodymium, promethium, and samarium) and heavy rare earth elements (europium, gadolinium, terbium, dysprosium, holmium, erbium, thulium, ytterbium, and lutetium). Scandium and yttrium are considered rare earths since they tend to occur in the same ore deposits as the lanthanoids and exhibit similar chemical properties.

In this regard, the mineral complex may comprise one or more rare earth elements selected from the group consisting of scandium, yttrium, lanthanum, cerium praseodymium, neodymium, promethium, samarium, europium, gadolinium, terbium, dysprosium, holmium, erbium, thulium, ytterbium, and lutetium. It is desirable that the mineral complex comprise at least one light rare earth element and at least one heavy rare earth element. In other embodiments, the mineral complex may comprise only light rare earth elements or only heavy rare earth elements. In a preferred embodiment, the mineral complex may comprise less than 50 ppm of each rare earth element. For example, the mineral complex may comprise about 40 ppm, about 30 ppm, about 25 ppm, about 20 ppm, about 15 ppm, about 10 ppm, about 5 ppm, about 4 ppm, about 3 ppm, about 2 ppm, about 1 ppm, or about 0.5 ppm of one or more rare earth elements. In another embodiment the mineral complex may comprise about 0.5 ppm to about 49 ppm, about 0.5 ppm to about 40 ppm, about 0.5 ppm to about 30 ppm, about 0.5 ppm to about 25 ppm, about 0.5 ppm to about 20 ppm, about 0.5 ppm to about 15 ppm, about 0.5 ppm to about 10 ppm, about 0.5 ppm to about 5 ppm, about 0.5 ppm to about 1 ppm, or about 0.5 ppm of one or more rare earth elements.

In a further embodiment, the mineral complex may comprise one or more of the following oxidized components: potassium oxide ($K_2O$), chromium oxide ($Cr_2O_3$), titanium oxide ($TiO_2$), manganese oxide (MnO), phosphorous oxide ($P_2O_5$), strontium oxide (SrO), and barium oxide (BaO). For example, the mineral complex may comprise about 0.001 wt. % to about 3 wt. %. about 0.01 wt. % to about 3 wt. %, about 0.01 wt. % to about 2 wt. %, about 0.1 wt. % to about 1 wt. %, or about 0.5 wt. % to about 1 wt. % $K_2O$, $Cr_2O_3$, $TiO_2$, MnO, $P_2O_5$, SrO, and/or BaO. In one embodiment, the mineral complex comprises less than about 3 wt. % (e.g., about 2.5 wt. %, about 2 wt. %, about 1.5 wt. %, about 1 wt. %, about 0.5 wt. %, or less than 0.5 wt. %) $K_2O$, $Cr_2O_3$, $TiO_2$, MnO, $P_2O_5$, SrO, and/or BaO. In another embodiment, the mineral complex comprises one or more of the following: about 0.5 wt. % to about 0.9 wt. % $K_2O$, about 0.01 wt. % to about 0.03 wt. % $Cr_2O_3$, about 1.0 wt. % to about 2.0 wt. % $TiO_2$, about 0.1 wt. % to about 0.3 wt. % MnO, about 0.1 wt. % to about 0.3 wt. % $P_2O_5$, about 0.01 wt. % to about 0.05 wt. % SrO, and/or about 0.01 wt. % to about 0.03 wt. % BaO.

The mineral complex of the invention also may comprise carbon (C). Preferably, the mineral complex comprises less than about 2 wt. % C. For example, the mineral complex may comprise about 1.5 wt. %, about 1.0 wt. %, about 0.5 wt. %, about 0.25 wt. %, about 0.1 wt. %, about 0.05 wt. %, about 0.04 wt. %, about 0.03 wt. %, or less than about 0.03 wt. % C. The mineral complex of the invention also may comprise sulfur (S). Preferably, the mineral complex comprises less than 1% S. For example, the mineral complex may comprise about 0.9 wt. %, about 0.5 wt. %, about 0.25 wt. %, about 0.1 wt. %, about 0.05 wt. %, about 0.04 wt. %, about 0.03 wt. %, about 0.02 wt. %, about 0.01 wt. %, or less than about 0.01 wt. % S.

The mineral complex of the invention also may further comprise at least one or more of (e.g., at least two or more of, at least three or more of, at least four or more of, or at least five or more of) the following: silver (Ag), barium (Ba), cobalt (Co), chromium (Cr), caesium (Cs), copper (Cu), gallium (Ga), hafnium (Hf), molybdenum (Mo), niobium (Nb), nickel (Ni), lead (Pb), rubidium (Rb), tin (Sn), strontium (Sr), tantalum (Ta), thorium (Th), thallium (Tl), uranium (U,) vanadium (V), tungsten (W), zinc (Zn), and zirconium (Zr). When present, the mineral complex preferably comprises less than 1000 ppm each of Ag, Ba, Co, Cr, Cs, Cu, Ga, Hf, Mo, Nb, Ni, Pb, Rb, Sn, Sr, Ta, Th, Tl, U, V, W, Zn, or Zr. For example, the mineral complex may comprise one or more of (e.g., at least two or more of, at least three or more of, at least four or more of, or at least five or more of) Ag, Ba, Co, Cr, Cs, Cu, Ga, Hf, Mo, Nb, Ni, Pb, Rb, Sn, Sr, Ta, Th, Tl, U, V, W, Zn, and Zr in the ranges set forth in Table 1.

TABLE 1

| Element | Range (ppm based on total weight of mineral complex) |
|---|---|
| Ag | about 0.0001 ppm to about 10 ppm |
| Ba | about 1 ppm to about 500 ppm |
| Co | about 0.01 ppm to about 200 ppm |
| Cr | about 1 ppm to about 400 ppm |
| Cs | about 0.0001 ppm to about 50 ppm |
| Cu | about 1 ppm to about 400 ppm |
| Ga | about 0.001 ppm to about 200 ppm |
| Hf | about 0.001 ppm to about 50 ppm |
| Mo | about 0.001 ppm to about 25 ppm |
| Nb | about 0.001 ppm to about 100 ppm |
| Ni | about 1 ppm to about 400 ppm |
| Pb | about 0.001 ppm to about 25 ppm |
| Rb | about 1 ppm to about 400 ppm |
| Sn | about 0.0001 ppm to about 15 ppm |
| Sr | about 1 ppm to about 600 ppm |
| Ta | about 0.0001 ppm to about 10 ppm |
| Th | about 0.001 ppm to about 200 ppm |
| Tl | about 0.0001 ppm to about 25 ppm |
| U | about 0.0001 ppm to about 25 ppm |
| V | about 1 ppm to about 600 ppm |
| W | about 0.0001 ppm to about 25 ppm |
| Zn | about 1 ppm to about 400 ppm |
| Zr | about 1 ppm to about 400 ppm |

The mineral complex of the invention also may comprise one or more of (e.g., one, two, three, four, five, or all six of) the following: arsenic (As), bismuth (Bi), mercury (Hg), antimony (Sb), selenium (Se), and tellurium (Te). Preferably, the mineral complex comprises less than 5 ppm of As, less than 5 ppm of Bi, less than 1 ppm of Hg, less than 5 ppm of Sb, less than 5 ppm of Se, and/or less than 5 ppm of Te. For example, the mineral complex may comprise one or more of (e.g., one, two, three, four, five, or all six of) As, Bi, Hg, Sb, Se, and Te in the ranges set forth in Table 2.

TABLE 2

| Element | Range (ppm based on total weight of mineral complex) |
|---|---|
| As | about 0.0001 ppm to about 4 ppm |
| Bi | about 0.0001 ppm to about 4 ppm |

TABLE 2-continued

| Element | Range (ppm based on total weight of mineral complex) |
|---|---|
| Hg | about 0.00001 ppm to about 0.5 ppm |
| Sb | about 0.0001 ppm to about 2 ppm |
| Se | about 0.0001 ppm to about 4 ppm |
| Te | about 0.0001 ppm to about 2 ppm |

In one embodiment, the mineral complex described herein has one or more (e.g., at least two, at least three, at least four, or at least five) of the following characteristics: an average weight in tons per cubic yard of about 1 to about 1.5 (e.g., about 1.3); a loss on ignition of about 0.2% to about 0.3% (e.g., about 0.25%); a fusion of about 2100 to about 2300 degrees Fahrenheit (e.g., about 2200); a mill abrasion loss (A.R.E.A.) of about 5% to about 6% (e.g., about 5.4%); a L.A. abrasion loss according to ASTM C535-89 of about 7.2 to about 8.2 (e.g., about 7.7); a L.A. abrasion loss according to ASTM C 131-89 of about 10.3 to about 11.3 (e.g., about 10.8); a specific gravity according to ASTM C97 of about 2.900 to about 3.060 (e.g., about 2.980); a specific gravity according to ASTM C 127 of about 2.900 to about 3.060 (e.g., about 2.980); an absorption according to ASTM C 127 of less than about 0.5% (e.g., less than 0.4%); and/or a soundness loss according to ASTM C 88 Mg Su of about 0.25% to about 0.75% (e.g., about 0.5%).

The mineral complex of the invention may be obtained in any physical size. Preferably, however, the mineral complex is crushed, ground, and/or milled into a powdered form using any routine methods known in the art.

In one embodiment, the mineral complex is in a powdered form wherein the particles have an average particle size of about 10 to about 6000 mesh (e.g., about 100 to about 6000 mesh, about 200 to about 6000 mesh, about 10 to about 1000 mesh, about 200 to about 4000 mesh). In one embodiment, the particles are very fine and have an average particle size of about 400 to about 6000 mesh, which corresponds to a size of about 37 microns to about 1 micron. For example, and in this embodiment, the particles may have an average particle size of about 400 to about 6000 mesh, about 400 to about 5000 mesh, about 400 to about 4000 mesh, about 400 to about 3000 mesh, about 400 to about 2000 mesh, about 400 to about 1000 mesh, about 400 to about 900 mesh, about 400 to about 800 mesh, about 400 to about 700 mesh, about 400 to about 600 mesh, about 400 to about 500 mesh, about 500 to about 6000 mesh, about 600 to about 6000 mesh, about 700 to about 6000 mesh, about 800 to about 6000 mesh, about 900 to about 6000 mesh, about 1000 to about 6000 mesh, about 2000 to about 6000 mesh, about 3000 to about 6000 mesh, about 4000 to about 6000 mesh, about 5000 to about 6000 mesh, about 500 to about 5000 mesh, about 600 to about 4000 mesh, about 700 to about 3000 mesh, about 800 to about 2000 mesh, about 900 to about 1000 mesh, about 1000 to about 6000 mesh, about 1500 to about 5-500 mesh, about 2500 to about 5000 mesh, about 3000 to about 4-500 mesh, about 3500 to about 4000 mesh, or about 4000 to about 6000 mesh.

In a related embodiment, the particles are slightly larger, having an average particle size of about 200 to about 400 mesh, which corresponds to a size of about 74 microns to about 37 microns. For example, and in this embodiment, the particles may have an average particle size of about 200 to about 400 mesh, about 230 to about 400 mesh, about 250 to about 400 mesh, about 275 to about 400 mesh, about 300 to about 400 mesh, about 325 to about 400 mesh, about 350 to about 400 mesh, about 375 to about 400 mesh, about 200 to about 375 mesh, about 200 to about 350 mesh, about 200 to about 325 mesh, about 200 to about 300 mesh, about 200 to about 275 mesh, about 200 to about 250 mesh, about 200 to about 225 mesh, or about 250 to about 350 mesh.

In yet another related embodiment, the particles have an even larger particle size of about 10 to about 200 mesh, which corresponds to a size of about 2000 microns to about 74 microns. For example, and in this embodiment, the particles can have an average particle size of about 10 to about 200 mesh, about 20 to about 200 mesh, about 40 to about 200 mesh, about 60 to about 200 mesh, about 80 to about 200 mesh, about 100 to about 200 mesh, about 120 to about 200 mesh, about 140 to about 200 mesh, about 160 to about 200 mesh, about 180 to about 200 mesh, about 10 to about 180 mesh, about 10 to about 160 mesh, about 10 to about 140 mesh, about 10 to about 120 mesh, about 10 to about 100 mesh, about 10 to about 80 mesh, about 10 to about 60 mesh, about 10 to about 40 mesh, about 10 to about 20 mesh, about 40 to about 180 mesh, about 60 to about 160 mesh, or about 80 to about 140 mesh. In a further related embodiment, the particles have an average particle size of about 50 to about 400 mesh, about 100 to about 400 mesh, about 120 to about 400 mesh, about 140 to about 400 mesh, or about 170 to about 400 mesh. The conversion of mesh sizes to microns is well known in the art.

The mineral complex described herein is useful in a variety of different applications, as described herein. Upon referring to the disclosure provided herein, one skilled in the art will appreciate that the particle size of the mineral complex may be selected based on the type of application in which the mineral complex is being used. For example, if equipment having a fine nozzle is used for the application or distribution of the mineral complex, it is preferable to use mineral complex of a size that will avoid clogging the spray tip (e.g., an average particle size of between about 1 and 37 microns (a mesh size of 400 to 6000)). In addition, one skilled in the art upon reading this disclosure should also appreciate that mineral complex having a relatively smaller average particle size (e.g., a mesh size of about 400 to about 6000 or a mesh size of about 200 to about 400) distributes/suspends/dissolves more readily in any medium, such as in a pond/lake/marine water, in moisture and bacterial exudates, in soil, in water used for hydroponics, and the like, as compared to mineral complex having a relatively larger average particle size (e.g., a mesh size of about 10 to about 200).

In addition, one skilled in the art should also appreciate that in some embodiments of the invention it is desirable to use a mineral complex comprising a variety of different average particle sizes. In this regard, it is contemplated that the mineral complex may comprise any combination of the foregoing ranges of particle sizes. For example, the mineral complex (and compositions thereof) described herein may comprise a certain amount of mineral complex having an average particle size of about 400 to about 6000 mesh, and/or a further amount of mineral complex having an average particle size of about 200 to about 400 mesh, and/or an additional amount of mineral complex having an average particle size of about 10 to about 200 mesh. By way of further example, the mineral complex (and compositions thereof) may comprise about 5% to about 85% (e.g., about 5%, about 10%, about 15%, about 20%, about 25%, about 30%, about 35%, about 40%, about 45%, about 50%, about 55%, about 60%, about 65%, about 70%, about 75%, about 80%, or about 85%) of the mineral complex having an average particle size of about 400 to about 6000 mesh, and/or about 15% to about 95% (e.g., about 15%, about 20%, about 25%, about 30%, about 35%, about 40%, about 45%, about 50%, about 55%, about 60%, about 65%, about 70%, about 75%, about 80%, about 85%, about 90%, or about 95%) of the mineral complex having an average particle size of about 200 to about 400 mesh, and/or about 5% to about 75% (e.g., about 5%, about 10%, about 15%, about 20%, about 25%, about 30%, about 35%, about 40%, about 45%, about 50%, about 55%, about 60%, about 65%, about 70%, or about 75%) of the mineral complex having an average particle size of about 10 to about 200 mesh. For example, the mineral complex (and compositions thereof) described herein may comprise about 50% of mineral complex having an average particle size of about 400 to about 6000 mesh and about 50% of mineral complex having an average particle size of about 200 to about 400 mesh, or the composition may comprise about 30% of mineral complex having an average particle size of about 400 to about 6000 mesh, about 50% of mineral complex having an average particle size of about 200 to about 400 mesh, and about 20% of mineral complex having an average particle size of about 10 to about 200 mesh.

Although average particle size may be conveniently measured by scanning electron microscopy (SEM) in accordance with techniques known to those skilled in the art, other techniques also may be used. Desirably, at least 75%, more desirably at least 80%, still more desirably at least 85%, preferably at least 90%, more preferably at least 95%, even more preferably at least 96%, still more preferably at least 97%, more preferably at least 98%, or at least 99% of the particles have a particle size falling within the ranges described herein.

In a related aspect, the invention further provides a composition comprising a binder and the mineral complex described herein. The binder, when mixed with the mineral complex, desirably binds the mineral complex therewithin, forming what may be referred to as an agglomeration of the mineral complex. This provides for easier packaging, handling and application of the mineral complex, with the binder permitting release of the mineral complex therefrom upon exposure of the composition to water. In a preferred embodiment, the binder is selected so that it provides for the extended release of mineral complex from the composition when the composition is exposed to a water-containing environment.

Upon referring to the disclosure provided herein, one skilled in the art will appreciate that a variety of materials may constitute a suitable binder, including an organic material or a synthetic material. For example, the binder may be brewers condensed soluble, cane molasses, beet syrup, beet molasses, desugared beet molasses, honey, whey, starch, sulfur, wax, polymer, oil, urea-formaldehyde, plant starches, protein gels, glues, gumming compositions, seaweed, peat, humic, crystallizing compounds, gelling clays, synthetic gel-forming compounds, and mixtures thereof. Additional examples of binders that may be used herein include carbohydrates, such as monosaccharides, disaccharides, oligosaccharides, and polysaccharides; proteins; lipids; glycolipid; glycoprotein; lipoprotein; and combinations and derivatives of the same. Exemplary carbohydrate binders include glucose, mannose, fructose, galactose, sucrose, lactose, maltose, xylose, arabinose, trehalose, and mixtures thereof, such as corn syrup; celluloses, such as carboxymethylcellulose, ethylcellulose, hydroxyethylcellulose, hydroxy-methylethylcellulose, hydroxyethylpropylcellulose, methylhydroxyethyl-cellulose, and methylcellulose; starches, such as amylose, seagel, starch acetates, starch hydroxyethyl ethers, ionic starches, long-chain alkyl starches, dextrins, amine starches, phosphates starches, and dialdehyde starches; plant starches, such as corn starch and potato starch; other carbohydrates, such as pectin, amylopectin, xylan, glycogen, agar, alginic acid, phycocolloids, chitin, gum arabic, guar gum, gum karaya, gum tragacanth, and locust bean gum; complex organic substances, such as lignin and nitrolignin; derivatives of lignin, such as lignosulfonate salts, including calcium lignosulfonate and sodium lignosulfonate; and complex carbohydrate-based compositions containing organic and inorganic ingredients such as molasses. Suitable protein binders include, for example, soy extract, zein, protamine, collagen, and casein. Binders operative herein also include synthetic organic polymers, such as oxide polymers, polyacrylamides, polyacrylates, polyvinyl pyrrolidone, polyethylene glycol, polyvinyl alcohol, polyvinylmethyl ether, polyvinyl acrylates, polylactic acid, and latex. Binders that may provide for the delayed or extended release of mineral complex from the composition upon exposure to water include, for example, materials that have relatively low water solubility.

The composition comprising the binder and mineral complex may be combined by any suitable method, including by subjecting these materials to steam, water, and/or pressure in order to facilitate the agglomeration of the mineral complex and the binder. The binder is desirably present in an amount sufficient to provide for the agglomeration of the amount of mineral complex to be processed. For example, the composition may comprise from about 0.1 wt. % to about 99.5 wt. % of the binder (e.g., about 0.1 wt. %, about 0.5 wt. %, about 1 wt. %, about 2 wt. %, about 3 wt. %, about 4 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, about 96 wt. %, about 97 wt. %, about 98 wt. %, about 99 wt. %, or about 99.5 wt. % binder). Preferably, the composition comprises from about 0.1 wt. % to about 50 wt. % binder (e.g., from about 0.1 wt. % to about 5 wt. %, from about 0.5 wt. % to about 10 wt. %, from about 1 wt. % to about 20 wt. %, from about 5 wt. % to about 25 wt. %, or from about 10 wt. % to about 50 wt. % binder).

Preferably, the binder binds the mineral complex into a form which resists attrition and will not rapidly degrade, and therefore substantially maintains particle size during handling. If desired, the binder may be added to the mineral complex as a solution. The solution is typically provided as a water-based slurry having about 40 to about 50 percent solids by weight and weighing about 10 pounds per gallon. The binder also may be added and mixed with the mineral complex as a dry ingredient, subsequently mixing in an amount of water. In addition, the composition may comprise agents such as surfactants, dispersants, disintegrating agents, wetting agents and the like.

Another aspect of the invention provides a composition comprising a fertilizing agent and the mineral complex described herein. This composition has many potential applications, and may be applied in combination with seed during planting, prior to planting, or anytime thereafter. The application onto maturing plants, and fully matured plants, also may be beneficial. The fertilizing agent may be present in the composition in an amount ranging from about 0.1 wt. % to about 99.5 wt. % (e.g., about 0.1 wt. %, about 0.5 wt. %, about 1 wt. %, about 2 wt. %, about 3 wt. %, about 4 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, about 96 wt. %, about 97 wt. %, about 98 wt. %, about 99 wt. %, or about 99.5 wt. % fertilizing agent). Preferably, the composition comprises from about 0.1 wt. % to about 50 wt. % fertilizing agent (e.g., from about 0.1 wt. % to about 5 wt. %, from about 0.5 wt. % to about 10 wt. %, from about 1 wt. % to about 20 wt. %, from about 5 wt. % to about 25 wt. %, or from about 10 wt. % to about 50 wt. % fertilizing agent).

Any suitable fertilizing agent known in the art may be included in the compositions described herein including, but not limited to, an organic fertilizing agent, an inorganic (i.e., synthetic) fertilizing agent, or combinations thereof. The fertilizing agent may be a commercially available fertilizing agent including, but not limited to slow release, soluble, and water insoluble fertilizing agents. Moreover, certain fertilizing agents also may be suitable for agglomerating the mineral complex, and thus may also serve as a binder therefor, as described herein. The identification of fertilizing agents that are suitable as binders for the mineral complex may be readily determined by one skilled in the art.

Exemplary organic fertilizing agents that may be used herein include manure, worm castings, compost, seaweed, humic, guano, brassin, peat moss, and mixtures thereof. Exemplary inorganic fertilizing agents that may be used herein include nitrogen, phosphorus, potassium, and mixtures thereof. Additional fertilizing agents that may be used in accordance with the invention described herein include urea, sulfur-coated urea, isobutylidene diurea, ammonium nitrate, ammonium sulfate, ammonium phosphate, triple super phosphate, phosphoric acid, potassium sulphate, potassium nitrate, potassium metaphosphate, potassium chloride, dipotassium carbonate, potassium oxide, urea ammonium sulfate, urea ammonium phosphate, proteins, amino acids, and combinations thereof.

Another aspect of the invention provides a composition comprising mulch and the mineral complex described herein. This composition may be used for many purposes, but may find particular utility when applied onto recently seeded areas, or onto areas wherein plants are beginning to sprout, as the composition as a whole, and the mulch and mineral complex individually, may assist in moisture retention, with the mineral complex assisting in augmenting the growth media. The mulch may be present in the composition in an amount ranging from about 0.1 wt. % to about 99.5 wt. % (e.g., about 0.1 wt. %, about 0.5 wt. %, about 1 wt. %, about 2 wt. %, about 3 wt. %, about 4 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, about 96 wt. %, about 97 wt. %, about 98 wt. %, about 99 wt. %, or about 99.5 wt. % mulch). Preferably, the composition comprises from about 0.1 wt. % to about 90 wt. % mulch (e.g., from about 0.1 wt. % to about 5 wt. %, from about 0.5 wt. % to about 10 wt. %, from about 1 wt. % to about 20 wt. %, from about 5 wt. % to about 25 wt. %, from about 10 wt. % to about 30 wt. %, from about 10 wt. % to about 40 wt. %, from about 15 wt. % to about 50 wt. %, from about 20 wt. % to about 60 wt. %, from about 30 wt. % to about 70 wt. %, from about 40 wt. % to about 80 wt. %, from about 50 wt. % to about 90 wt. %, from about 70 wt. % to about 90 wt. %, or from about 80 wt. % to about 90 wt. % mulch).

Any suitable mulch known in the art may be used in the compositions described herein, and may further comprise an inorganic mulch and/or an organic mulch. Exemplary inorganic mulches that may be used in accordance with the invention described herein include rubber, plastic, rock, gravel, and mixtures thereof. Exemplary organic mulches that may be used in accordance with the invention described herein include leaves, hay, straw, bark, sawdust, wood chips, paper, and mixtures thereof.

The invention also provides a composition comprising seed and the mineral complex described herein. The composition may comprise any type of seed known in the art. Preferably, the seed is grass seed, wild flower seed, indigenous seed or seed which matures into a cultivatable crop, such as soybeans, corn, wheat or the like. Exemplary grass seeds that may be used in accordance with the invention described herein include Poa, Lolium, Dactylis, Festuca, Deschampsia, Koeleria, Agrostis, Cynodon, Zoysia, Buchlo, Axonopus, Eremchloa, Paspalum, Stentaphrum and mixtures thereof.

The seed may be present in the composition in an amount ranging from about 0.1 wt. % to about 99.5 wt. % (e.g., about 0.1 wt. %, about 0.5 wt. %, about 1 wt. %, about 2 wt. %, about 3 wt. %, about 4 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, about 96 wt. %, about 97 wt. %, about 98 wt. %, about 99 wt. %, or about 99.5 wt. % seed). Preferably, the composition comprises from about 0.1 wt. % to about 90 wt. % seed (e.g., from about 0.1 wt. % to about 5 wt. %, from about 0.5 wt. % to about 10 wt. %, from about 1 wt. % to about 20 wt. %, from about 5 wt. % to about 25 wt. %, from about 10 wt. % to about 30 wt. %, from about 10 wt. % to about 40 wt. %, from about 15 wt. % to about 50 wt. %, from about 20 wt. % to about 60 wt. %, from about 30 wt. % to about 70 wt. %, from about 40 wt. % to about 80 wt. %, from about 50 wt. % to about 90 wt. %, from about 70 wt. % to about 90 wt. %, or from about 80 wt. % to about 90 wt. % seed).

The mineral composition may be present in any of the compositions described herein in any amount. The amount of mineral complex present in each of the compositions described herein can readily be determined by one of ordinary skill in the art based on the desired wt. % of the other components of the composition and/or the desired application rate of the mineral complex. For example, the mineral complex may be present in the composition in an amount ranging from about 0.1 wt. % to about 99.5 wt. % of the composition (e.g., about 0.1 wt. %, about 0.5 wt. %, about 1 wt. %, about 2 wt. %, about 3 wt. %, about 4 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, about 96 wt. %, about 97 wt. %, about 98 wt. %, about 99 wt. %, or about 99.5 wt. % mineral complex). In one aspect of the invention, the mineral complex is present in the composition in an amount ranging from about 0.1 wt. % to about 90 wt. % seed (e.g., from about 0.1 wt. % to about 5 wt. %, from about 0.5 wt. % to about 10 wt. %, from about 1 wt. % to about 20 wt. %, from about 5 wt. % to about 25 wt. %, from about 10 wt. % to about 30 wt. %, from about 10 wt. % to about 40 wt. %, from about 15 wt. % to about 50 wt. %, from about 20 wt. % to about 60 wt. %, from about 30 wt. % to about 70 wt. %, from about 40 wt. % to about 80 wt. %, from about 50 wt. % to about 90 wt. %, from about 70 wt. % to about 90 wt. %, or from about 80 wt. % to about 90 wt. % seed). In another aspect of the invention, the mineral complex is present in the composition in an amount ranging from about 1 wt. % to about 70 wt. % of the composition, desirably about 10 wt. % to about 60 wt. %, more desirably about 15 wt. % to about 50 wt. %, and even more desirably about 20 wt. % to about 40 wt. % of the composition. Desirably the compositions described herein comprise about 50 wt. % or more of the mineral complex, and more desirably about 70 wt. %, and even more desirably about 80 wt. %, or about 90 wt. % of the mineral complex.

The mineral complex, and compositions thereof, described herein may be dry or may further comprise water to form liquid compositions. Liquid compositions are particularly useful in applying the various compositions efficiently over relatively large areas. When the composition is in the form of a liquid composition, the composition may comprise between about 10 lbs and about 1000 lbs of mineral complex (e.g., about 10 lbs, about 25 lbs, about 50 lbs, about 75 lbs, about 100 lbs, about 150 lbs, about 200 lbs, about 250 lbs, about 300 lbs, about 350 lbs, about 400 lbs, about 450 lbs, about 500 lbs, about 550 lbs, about 600 lbs, about 700 lbs, about 750 lbs, about 800 lbs, about 850 lbs, about 900 lbs, about 950 lbs, or about 1000 lbs of mineral complex) for every about 100 to about 500 gallons of water (e.g., about 100 gallons, about 150 gallons, about 200 gallons, about 250 gallons, about 300 gallons, about 350 gallons, about 400 gallons, about 450 gallons, or about 500 gallons of water). For example, the composition may comprise between about 25 lbs and about 500 lbs of mineral complex for every about 100 to about 500 gallons of water, between about 25 lbs and about 500 lbs of mineral complex for every about 200 to about 300 gallons of water, or between about 50 lbs and about 300 lbs of mineral complex for every about 200 to about 300 gallons of water. Preferably, the composition comprises between about 25 lbs and about 500 lbs of mineral complex per about 250 gallons of water.

In addition, and if desired, the liquid composition, which includes the mineral complex, may further comprise between about 5 lbs and about 200 lbs of seed (e.g., about 5 lbs, about 10 lbs, about 25 lbs, about 50 lbs, about 75 lbs, about 100 lbs, about 125 lbs, about 150 lbs, about 175 lbs, or about 200 lbs of seed) per about every 100 to about 500 gallons of water (e.g., about 100 gallons, about 150 gallons, about 200 gallons, about 250 gallons, about 300 gallons, about 350 gallons, about 400 gallons, about 450 gallons, or about 500 gallons of water). For example, the composition may comprise between about 10 lbs and about 100 lbs of seed per about every 100 to about 500 gallons of water. Preferably, the composition comprises between about 10 lbs and about 100 lbs of seed per about 250 gallons of water. These compositions desirably are prepared on site, with the dry materials being added to the liquid just prior to application, as will be understood and appreciated by those skilled in the art.

The invention also provides a composition comprising the mineral complex described herein and at least two additional components selected from a binder, a fertilizing agent, mulch, seed, and water. In particular, the composition may be a dry or liquid composition comprising the mineral complex in combination with any binder, fertilizing agent, mulch, and/or seed as described herein. For example, the composition may comprise (a) the mineral complex, seed, and mulch; (b) the mineral complex, seed, and fertilizing agent; (c) the mineral complex, seed, mulch, and fertilizing agent; or (d) the mineral complex, mulch, and fertilizing agent; wherein any of the aforementioned compositions optionally comprise water and wherein any of the aforementioned compositions optionally comprise a binder. Compositions (a) and (c) may find particular utility in re-vegetation, as will be appreciated by those skilled in the art.

The compositions of the invention described herein may be, if desired, provided in the form of at least one pellet. In one embodiment, the composition is in the form of a plurality of pellets. The pelletizing can be accomplished using conventional pelletizing equipment, such as pelletizing pans and drum granulators.

The pellets of the present invention may have an average diameter of from about 0.1 mm to about 30 mm. For example, the average diameter of the pellets may range from about 0.1 mm to about 10 mm, from about 0.25 mm to about 20 mm, or from about 0.50 mm to about 15 mm. The pellets may be formed in any shape, including spheres, cylinders, ellipses, rods, cones, discs, needles, and irregular.

In another embodiment, the invention provides a device in which the mineral complex (or composition thereof) is enclosed within a medium, wherein the medium provides for the controlled release of the mineral complex from the medium when the medium is exposed to a water-containing environment. Any suitable medium known in the art may be used. Preferably, the medium comprises a cellulosic material or a perforated membrane which surrounds the mineral complex.

In another aspect, the invention provides a process for augmenting growth medium comprising applying onto the growth medium a composition comprising the mineral complex described herein. The process may further comprise applying water, seed, mulch, fertilizing agent, or any combination thereof onto the growth medium. In one embodiment of the invention, the composition comprising the mineral complex is applied simultaneously with one or more of water, seed, mulch, fertilizing agent, or any combination thereof onto the growth medium. For example, the process may comprise applying onto the medium a composition comprising the mineral complex and one or more of water, seed, mulch, or fertilizing agent, as described herein. Alternatively, the process may comprise simultaneously applying onto the medium a composition comprising the mineral complex and one or more compositions comprising water, seed, mulch, fertilizing agent, or any combination thereof. Any of the compositions comprising the mineral complex also may comprise a binder, as described herein.

In another embodiment of the invention, the composition comprising the mineral complex is applied onto the growth medium sequentially with one or more of water, seed, mulch, fertilizing agent, or any combination thereof. For example, the mineral complex may be applied to the growth medium prior to the application of water, seed, mulch, fertilizing agent, or any combination thereof. Alternatively, the mineral complex may be applied to the growth medium following the application of water, seed, mulch, fertilizing agent, or any combination thereof. For example, the mineral complex may be applied onto the growth medium at least 1 hour (e.g., about 1 hour, about 2 hours, about 3 hours, about 4 hours, about 5 hours, about 6 hours, about 8 hours, about 10 hours, about 12 hours, about 16 hours, about 20 hours, about 1 day, about 2 days, about 3 days, about 4 days, about 5 days, about 6 days, about 7 days, or 2 weeks or more) prior to the application of water, seed, mulch, fertilizing agent, or any combination thereof, or the mineral complex may be applied to the growth medium at least 1 hour (e.g., about 1 hour, about 2 hours, about 3 hours, about 4 hours, about 5 hours, about 6 hours, about 8 hours, about 10 hours, about 12 hours, about 16 hours, about 20 hours, about 1 day, about 2 days, about 3 days, about 4 days, about 5 days, about 6 days, about 7 days, or 2 weeks or more) after the application of water, seed, mulch, fertilizing agent, or any combination thereof.

The growth medium, for purposes of the present invention, includes water, soil, and combinations thereof. As used herein, the term "water" refers to any type of water, such as fresh water (e.g., water in lakes, ponds, streams and rivers) or salt water (e.g., oceans). The growth of vegetation and plants in water, without soil, is referred to as hydroponics.

As used herein, the term "soil" refers to any type of soil, such as sand, silt, clay, or combinations thereof. Soil type may be routinely determined by one of skill in the art in accordance with any one of the soil classification systems known in the art. For example, the soil type may be determined using the USDA soil taxonomy classification system or the World Reference Base for Soil Resources classification system, which use taxonomic criteria involving soil morphology and laboratory tests to inform and refine hierarchical classes. The most common engineering classification system for soils in North America is the Unified Soil Classification System. The Unified Soil Classification System has three major classification groups: (1) coarse-grained soils (e.g., sands and gravels); (2) fine-grained soils (e.g., silts and clays); and (3) highly organic soils (referred to as "peat"). The Unified Soil Classification System further subdivides the three major soil classes for clarification. Additional examples of soil classification systems include the American Association of State Highway and Transportation Officials (AASHTO) soil classification system, the Australian soil classification system, the Canadian system of soil classification, and the Food and Agriculture Organization of the United Nations (FAO) soil classification, also called World soil classification.

In addition, the growth medium may be any combination of water and soil. One of ordinary skill in the art will understand and appreciate that a variety of combinations of water and soil (e.g., about 50 wt. % water and about 50 wt. % soil, about 25 wt. % water and about 75 wt. % soil, or about 25 wt. % soil and about 75 wt. % water) may be used as the growth medium.

The growth medium may be bare or may be covered with vegetation. When applied to vegetation, the compositions described herein may be applied to root systems, stems, seeds, grains, tubers, flowers, fruit, foliage, branches, etc., as desired. The mineral complex (and compositions thereof) may be applied to the growth medium using any application method known in the art. Specific application methods that may be useful for the application of the mineral complex and compositions thereof are described herein.

Application of the mineral complex, compositions thereof, and desirably those which include seed, onto soil that is classified as clay also is contemplated by the invention. The soil may be classified as clay in accordance with ASTM D2487 and/or the soil may be classified as CH, OH, or CL in accordance with the Unified Soil Classification System. The compositions described herein have found particular utility in promoting the growth of vegetation, such as grasses and other plants, in clay soils used to construct dams, levees and other structures.

Application of the compositions described herein onto soil that is classified as sand also is contemplated by the invention. The soil may be classified as sand in accordance with ASTM D2487 and/or the soil may be classified as SW, SP, SM, or SC in accordance with the Unified Soil Classification System.

The compositions described herein also have utility in promoting moisture retention in soil, such as sand, silt, clay, or any combination thereof. Thus, in a further aspect, the invention provides a process for promoting, enhancing and/or increasing moisture retention in soil comprising introducing into the soil the mineral complex and/or compositions thereof as described herein. The mineral complex and compositions thereof described herein are particularly useful in promoting, enhancing, and/or increasing moisture retention in sand.

Enhanced moisture retention in soil refers to an increase in the moisture (e.g., water) content of the soil into which the mineral complex and compositions thereof described herein have been introduced relative to the moisture content of the same type or classification of soil in which the compositions described herein have not been introduced (i.e., growth medium that has not been treated with the mineral complex). For example, the moisture or water content of the soil into which a composition comprising the mineral complex has been introduced may increase at least about 1% (e.g., about 1%, about 2%, about 3%, about 4%, about 5%, about 6%, about 7%, about 8%, about 9%, about 10%, about 15%, about 20%, about 25%, or more) as relative to soil not treated with the mineral complex. Methods for measuring the moisture or water content of soil are known in the art. For example, soil water content (v/v) can be measured using an EC-5 probe with data recorded on an ECHO-5 datalogger (Decagon Inc., Pulham, Wash.), as described in Example 2.

It is believed that enhanced moisture retention in soil also may provide an increase in the growth of bacteria (also known as "bacterial bloom") within the soil. In many instances, these bacteria can be beneficial to plant growth. Thus, in one related embodiment, the invention provides a process for promoting, enhancing, and/or increasing the growth of bacteria that are beneficial to plant growth within soil, such as sand, silt, clay, or combination thereof, comprising introducing into the soil the compositions described herein.

The mineral complex and compositions thereof described herein also have utility in preventing, reducing, slowing, or mitigating erosion of soil, such as sand, clay, silt, and combinations thereof. Thus, the invention also provides a process for preventing, reducing, slowing, or mitigating erosion in soil comprising introducing into the soil the mineral complex or compositions thereof, as described herein. Desirably, the mineral complex or compositions thereof are introduced into the soil in an amount sufficient to provide for the application of mineral complex thereto in an amount ranging from about 200 lbs per acre and about 10,000 lbs per acre.

In another aspect, the invention provides a process for enhancing the germination rate of a seed in a growth medium comprising implanting the seed in the growth medium and introducing into or applying onto the growth medium a mineral complex or a composition comprising the mineral complex, as described herein. The growth medium may be any type of growth medium, including soil, water (e.g., hydroponics), and combinations thereof, as described herein. The mineral complex may be applied onto the growth medium prior to implantation of the seed, at the time the seed is implanted, or after implantation of the seed. For example, the mineral complex may be applied onto the growth medium at least 1 hour (e.g., about 1 hour, about 2 hours, about 3 hours, about 4 hours, about 5 hours, about 6 hours, about 8 hours, about 10 hours, about 12 hours, about 16 hours, about 20 hours, about 1 day, about 2 days, about 3 days, about 4 days, about 5 days, about 6 days, about 7 days, or 2 weeks or more) prior to the implantation of the seed or the mineral complex may be applied onto the growth medium at least 1 hour (e.g., about 1 hour, about 2 hours, about 3 hours, about 4 hours, about 5 hours, about 6 hours, about 8 hours, about 10 hours, about 12 hours, about 16 hours, about 20 hours, about 1 day, about 2 days, about 3 days, about 4 days, about 5 days, about 6 days, about 7 days, or 2 weeks or more) after the implantation of the seed.

Enhanced germination rate of a seed refers to an increase in the germination rate of the seed in growth medium in which the mineral complex described herein has been introduced relative to the germination rate of the seed in growth medium in which the mineral complex has not been introduced (i.e., growth medium that has not been treated with the mineral complex). For example, the germination rate of the seed may increase by at least about 6 hours (e.g., about 6 hours, about 12 hours, about 18 hours, about 1 day, about 2 days, about 3 days, about 4 days, about 5 days, about 6 day, or even about 7 days, or more) as relative to the germination rate of a seed in growth medium not treated with the mineral complex.

In one aspect, the invention provides a process for enhancing growth in plants in a hydroponic growth medium (i.e., wherein the growth medium is water) comprising applying onto the hydroponic growth medium the mineral complex or compositions comprising the mineral complex, as described herein. The mineral complex may be introduced into the hydroponic growth medium prior to implantation of any plant, at the time a plant is introduced into the medium, or after a plant is introduced into the medium. For example, a plant may be introduced into the hydroponic growth medium at least 1 hour (e.g., about 1 hour, about 2 hours, about 3 hours, about 4 hours, about 5 hours, about 6 hours, about 8 hours, about 10 hours, about 12 hours, about 16 hours, about 20 hours, about 1 day, about 2 days, about 3 days, about 4 days, about 5 days, about 6 days, about 7 days, or 2 weeks or more) prior to the introduction of the mineral complex (or composition thereof) or a plant may be introduced into the hydroponic growth medium at least 1 hour (e.g., about 1 hour, about 2 hours, about 3 hours, about 4 hours, about 5 hours, about 6 hours, about 8 hours, about 10 hours, about 12 hours, about 16 hours, about 20 hours, about 1 day, about 2 days, about 3 days, about 4 days, about 5 days, about 6 days, about 7 days, or 2 weeks or more) after the introduction of the mineral complex (or composition thereof).

While the compositions described herein may be applied onto a variety of soil types, the composition finds particular utility in remediating sodic soils. Sodic soils are characterized by a disproportionately high concentration of sodium (Na) in their cation exchange complex relative to the normal soil type for a given region (or classification). They are usually defined as having an exchangeable sodium percentage greater than 15%. These soils tend to occur within arid to semi-arid regions and are innately unstable, exhibiting poor physical and chemical properties, which impede water infiltration, water availability, and ultimately plant growth. Thus, in one aspect of the invention, the compositions described herein find particular utility in remediating soil having an elevated level of sodium (Na) relative to normal soil. In this regard, the invention provides a process for remediating soil having an elevated level of sodium (Na) relative to normal soil comprising applying onto the soil having an elevated level of sodium relative to normal soil a composition comprising the mineral complex, as described herein.

In a related aspect of the invention, the compositions described herein are applied to saline soil. Saline soil is soil having an excess of salt relative to normal soil, wherein the excess salt is predominantly sodium chloride. Thus, in one aspect of the invention, the compositions described herein find particular utility in remediating soil having an elevated level of sodium chloride (NaCl) relative to normal soil. This is believed to be beneficial in areas that have been subjected to hurricanes and flooding, wherein land has been subjected to salt deposits from ocean water, which has in turn reduced plant viability. For example, the elevated NaCl level in the soil may be from about 25 ppm to about 500,000 ppm, from about 50 ppm to about 250,000 ppm, from about 50 ppm to about 500,000 ppm, from about 100,000 to about 500,000 ppm, or from about 250,000 to about 500,000 ppm.

The compositions described herein are also useful in remediating soil having an elevated level of at least one of sulfur, calcium, or magnesium relative to normal soil for a given region (or classification).

In another aspect of the invention, the compositions described herein are applied to alkaline soil. Alkaline soil is soil having a high pH (e.g., a pH of about 8.5 or greater) due to the presence of excessive sodium carbonate ($Na_2CO_3$). Thus, in one aspect of the invention, the compositions described herein find particular utility in remediating soil having an elevated level of sodium carbonate ($Na_2CO_3$) relative to normal soil (of that region or classification). In a related aspect of the invention, the composition described herein find particular utility in remediating soil having a pH of about 8.5 or greater (e.g., a pH of about 8.5, 8.6, 8.7, 8.8, 8.9, 9.0, 9.1, 9.2, 9.3, 9.4, 9.5, 9.6, 9.7, 9.8, 9.9, or 10), a pH of about 9.0 or greater, a pH of about 9.5 or greater, a pH of about 8.5 to about 10, or a pH of about 9 to about 10.

In a related aspect, the invention provides a process for enhancing the ability of sodium-enriched soil to support vegetation comprising applying on to the soil a composition comprising the mineral complex, as described herein, wherein the soil into which the mineral complex has been introduced exhibits enhanced vegetation relative to soil in which the mineral complex has not been introduced (i.e., soil that has not been treated with the mineral complex). Sodium-enriched soil refers to soil having a increased proportion of sodium relative to normal soil. Examples of sodium-enriched soils include sodic soils, saline soils, and alkaline soils, as discussed herein. In one embodiment, the process further comprises introducing seed into the soil onto which the mineral complex has been applied. In another embodiment, the process further comprises introducing vegetation into the soil onto which the mineral complex has been applied.

The seed or vegetation may be introduced into the soil prior to, simultaneously with, or after the application of the mineral complex (or compositions thereof) on the soil. For example, the seed or vegetation may be introduced into the soil at least 1 hour (e.g., about 1 hour, about 2 hours, about 3 hours, about 4 hours, about 5 hours, about 6 hours, about 8 hours, about 10 hours, about 12 hours, about 16 hours, about 20 hours, about 1 day, about 2 days, about 3 days, about 4 days, about 5 days, about 6 days, about 7 days, or 2 weeks or more) prior to the application of the mineral complex (or compositions thereof) or the seed or vegetation may be introduced into the soil at least 1 hour (e.g., about 1 hour, about 2 hours, about 3 hours, about 4 hours, about 5 hours, about 6 hours, about 8 hours, about 10 hours, about 12 hours, about 16 hours, about 20 hours, about 1 day, about 2 days, about 3 days, about 4 days, about 5 days, about 6 days, about 7 days, or 2 weeks or more) after the introduction of the mineral complex (or compositions thereof). Exemplary types of seed, as well as compositions comprising the mineral complex and seed, are described herein.

In a further aspect of the invention, a method for remediating water contaminated by oil or oil-based materials is provided. This method comprises the steps of applying a composition comprising the mineral complex described herein into the contaminated water, and, as an optional second step, removing the oil and/or oil-based materials from the water after application of the composition. It is contemplated that this aspect of the invention may find use in connection with the remediation of either fresh (e.g., water in lakes, ponds, streams and rivers) or salt water (e.g., oceans) contaminated by oil and oil-based materials, particularly water contaminated by crude oil. This being said, the aforesaid contamination of water may arise under a variety of circumstances, including without limitation, spillage or seepage from storage facilities, leaking transport vessels, damaged pipelines, drilling operations, or improper disposal.

Desirably, the method may be used in the remediation of water contaminated by liquid oil and/or oil-based products, as well as products that are liquifiable. By liquid, it is meant that the viscosity is such that the material is capable of flowing; such liquids desirably having a viscosity of less than about 20,000 cp, and more desirably ranging from about 0.1, 1, 100, 500, 1000 and 2000 cp up to about 5000, 10,0000, 15,000 and 20,000 cp (25° C.).

The oil or oil-based contaminants that may be at least partially removed from water by the inventive method vary widely, and include, without limitation, crude oil or petroleum, as well as distilled, extracted and/or refined products thereof such as industrial oils and oil-based products, e.g., diesel fuel, gasoline, kerosene, fuel oil, lubricating oil and the like. Oil-based contaminants may include, without limitation, oil-containing paints, solvents and coatings.

The composition may contain other materials in addition to the mineral complex described herein. By way of example only, the composition may further include surfactants, dispersants, emulsifiers, absorbants, enzymes, microorganisms, fungi, nitrate and/or sulfate fertilizers, and natural materials such as plants, e.g., grasses, hay, starches, and the like. The inventive method also may be used in combination with other oil remediation methods.

The amount of the composition that may be applied into the contaminated water may vary depending on the amount of contaminant present, and may be readily determined by one skilled in the art. In one embodiment of the invention, the mineral complex and compositions comprising the mineral complex described herein are applied onto the water in an amount sufficient to provide therein mineral complex in an amount ranging from about 25 lbs to about 5,000 lbs of the mineral complex per 5,000 square feet of surface area of water (e.g., about 25 lbs, about 50 lbs, about 100 lbs, about 150 lbs, about 200 lbs, about 250 lbs, about 300 lbs, about 350 lbs, about 400 lbs, about 450 lbs, about 500 lbs, about 550 lbs, about 600 lbs, about 650 lbs, about 700 lbs, about 750 lbs, about 800 lbs, about 850 lbs, about 900 lbs, about 950 lbs, about 1,000 lbs, about 1,500 lbs, about 2,000 lbs, about 2,500 lbs, about 3,000 lbs, about 3,500 lbs, about 4,000 lbs, or about 4,500 lbs per 5,000 square feet of surface area of water). Desirably, the mineral complex and compositions comprising the mineral complex described herein are applied onto the water to provide therein between about 50 lbs and about 500 lbs of the mineral complex per 5,000 square feet of surface area of water.

The frequency of the application of the composition into the contaminated water may vary depending on the amount of contaminant present, and may be readily determined by one skilled in the art. In one embodiment of the invention, the process comprises repeating the application of the composition onto the contaminated water at least once after the initial application thereof. The application of the composition may be repeated at any suitable time interval following the initial application, such as 1 week, 2 weeks, 3 weeks, 4 weeks, 1 month, or 2 months, or more after the initial application. In some embodiments, the composition is applied to the contaminated water on a regular basis (e.g., the composition is applied to the contaminated water every week, every 2 weeks, every 3 weeks, every 4 weeks, every 5 weeks, every 6 weeks, every 7 weeks, every 8 weeks, every 9 weeks, or every 10 weeks). The total length of the treatment of the contaminated water may vary depending on the amount of the contaminant present, and may readily determined by one skilled in the art. For example, the composition may be applied on a regular basis until all of the contaminant is removed from the water. In some embodiments, the composition is applied to the contaminated water on a regular basis for at least 3 months, at least 6 months, at least 9 months, or at least 1 year until all of the contaminant is removed from the water.

After application, the composition may remain resident in the contaminated water for a period of time, after which the composition and contaminants may, if desired, be removed and/or separated from the water by available mechanical means, e.g., vacuum, pumping, collection via booms, followed by a separation process such as, e.g., filtration, and other known liquid/solid separation processes.

In one aspect, the invention provides a process for remediating contaminated soil comprising introducing into the soil the compositions described herein. The contaminated soil may be sand, silt, clay, or any combination thereof. Many different types of soil contamination are known in the art. The inventive process described herein may be used to treat any soil that is determined by one of ordinary skill in the art to be contaminated relative to normal soil. For example, the soil may be contaminated with one or more of the following: asbestos, radioactive substances, sewage, oil, fuel, pesticides, solvents, landfill waste, chemicals, or heavy metals. Soil that is contaminated with heavy metals may be contaminated with at least one of lead, mercury, zinc cadmium, or chromium.

Soil that is contaminated with oil and/or fuel, such as petroleum, may have an elevated level of hydrocarbons relative to normal soil. Thus, in one embodiment, the compositions described herein are used to remediate soil having an elevated level of hydrocarbons, e.g., soil that has been subjected to an oil spill.

The contaminated soil may be bare or may comprises vegetation prior to the introduction of mineral complex or compositions thereof. If the contaminated soil comprises vegetation, the application or introduction of the mineral complex to the contaminated soil is expected to increase or enhance the growth of the existing vegetation. For example, the growth of the existing vegetation may be increased by at least about 5% (e.g., about 5%, about 10%, about 15%, about 20%, about 25%, about 30%, about 35%, about 40%, about 45%, about 50%, or more) relative to the growth of vegetation on contaminated soil into which the mineral complex has not been introduced.

In another aspect, the process further comprises introducing vegetation into the contaminated soil into which the mineral complex has been introduced or applied. The vegetation may be introduced to the contaminated soil, either prior to, simultaneously with, or after, the introduction of the composition comprising the mineral complex. In a related aspect of the invention, the process further comprising applying seed to the contaminated soil, either prior to, simultaneously with, or after, the introduction or application of the mineral complex or composition thereof. For example, the vegetation or seed may be introduced into the soil at least 1 hour (e.g., about 1 hour, about 2 hours, about 3 hours, about 4 hours, about 5 hours, about 6 hours, about 8 hours, about 10 hours, about 12 hours, about 16 hours, about 20 hours, about 1 day, about 2 days, about 3 days, about 4 days, about 5 days, about 6 days, about 7 days, or 2 weeks or more) prior to the introduction of the composition comprising the mineral complex or the vegetation or seed may be introduced into the soil at least 1 hour (e.g., about 1 hour, about 2 hours, about 3 hours, about 4 hours, about 5 hours, about 6 hours, about 8 hours, about 10 hours, about 12 hours, about 16 hours, about 20 hours, about 1 day, about 2 days, about 3 days, about 4 days, about 5 days, about 6 days, about 7 days, or 2 weeks or more) after the introduction of the composition comprising the mineral complex. Exemplary types of seed, as well as compositions comprising the mineral complex and seed, are described herein.

The mineral complex and compositions comprising the mineral complex, as described herein, may be applied for purposes of soil remediation at a rate of between about 200 lbs per acre and about 10,000 lbs per acre (e.g., about 200 to about 10,000 lbs per acre, about 200 to about 9,000 lbs per acre, about 200 to about 8,000 lbs per acre, about 200 to about 7,000 lbs per acre, about 200 to about 6,000 lbs per acre, about 200 to about 5,000 lbs per acre, about 200 to about 4,000 lbs per acre, about 200 to about 3,000 lbs per acre, about 200 to about 2,000 lbs per acre, about 200 to about 1,000 lbs per acre, about 200 to about 900 lbs per acre, about 200 to about 800 lbs per acre, about 200 to about 700 lbs per acre, about 200 to about 600 lbs per acre, about 300 to about 500 lbs per acre, about 300 to about 400 lbs per acre, about 400 to about 6,000 lbs per acre, about 500 to about 5,000 lbs per acre, about 600 to about 4,000 lbs per acre, about 700 to about 3,000 lbs per acre, about 800 to about 2,000 lbs per acre, or about 900 lbs per acre, about 1,000 lbs per acre, about 2,000 lbs per acre, or about 3,000 lbs per acre). Desirably, the mineral complex and compositions comprising the same are applied at about 250 lbs to about 5000 lbs per acre (e.g., about 250 lbs, about 300 lbs, about 350 lbs, about 400 lbs, about 450 lbs, about 500 lbs, about 550 lbs, about 600 lbs, about 650 lbs, about 700 lbs, about 750 lbs, about 800 lbs, about 850 lbs, about 900 lbs, about 950 lbs, about 1000 lbs, about 1500 lbs, about 2000 lbs, about 2500 lbs, about 3000 lbs, about 3500, about 4000 lbs, about 4500 lbs, or about 5000 lbs per acre). In a preferred embodiment, the mineral complex and compositions comprising the same are applied at about 200 lbs to about 3,000 lbs per acre or at about 1,000 lbs to about 3,000 lbs per acre.

The invention also provides a method for stimulating reproductive growth in plants, which method comprises applying the mineral complex or compositions thereof, as described herein, to the plants or to the environment thereof. The invention also provides a method for stimulating or accelerating the germination time of seeds, which method comprises applying the mineral complex described herein to the seeds or to the environment thereof. The invention also provides a method for promoting maturity in plants, which method comprises applying the mineral complex or compositions thereof, as described herein, to the plants or to the environment thereof. The invention also provides a method of increasing flowering or for accelerating the onset of flowering in plants, which method comprises applying the mineral complex or compositions thereof, as described herein, to the plants or to the environment thereof. The invention also provides a method for improving or accelerating the onset of coloration in plants, which method comprises applying the mineral complex or compositions thereof, as described herein, to the plants or to the environment thereof. The invention also provides a method for improving or accelerating the onset of fruiting in plants, which method comprises applying the mineral complex or compositions thereof, as described herein, to the plants or to the environment thereof. Unless otherwise noted by context, the environment of the plants or seeds includes any water, air, soil, fertilizer, or mulch surrounding the plants or seeds.

The mineral complex and compositions comprising the mineral complex, as described herein, may be applied to a solid (e.g., soil or vegetation) or a liquid (e.g., water) surface, as described herein, in any conventional manner. In one embodiment, the mineral complex and compositions comprising the mineral complex are applied to soil, water, or vegetation in dry form. For example, a conventional spreader or sprayer may be used to distribute the dry form of the mineral complex and compositions comprising the same over the soil, water, or vegetation. In one embodiment, the mineral complex and compositions comprising the mineral complex are applied onto the solid or liquid surface in dry form by spraying. Alternatively, the mineral complex and compositions comprising the same may be applied in bulk to soil or vegetation and then manually spread or raked over the soil or vegetation. In a related embodiment, the mineral complex and compositions comprising the mineral complex may be applied in bulk to water and thereafter, desirably, the water may be agitated in order to distribute the mineral complex relatively uniformly throughout the water prior to application. Similar mixing and dispersing methods may be employed to apply dry formulations comprising binder, seed, mulch, fertilizing agent, or any combination thereof.

In another embodiment, the mineral complex and compositions comprising the mineral complex, as described herein, are applied to soil, water, or vegetation in dry or in liquid form. In the latter regard, water may be added to the mineral complex or the composition comprising the mineral complex as described herein. The amount of water to be added may be routinely determined by one of ordinary skill in the art depending on the particular application method employed. Exemplary methods of applying liquid formulations include pumping, spraying, e.g., by means of an electrostatic or other conventional sprayer, or drip irrigation methods or fertigation systems, which involve application directly to the soil. Examples of conventional sprayers include hydroseeders and backpack sprayers. In a preferred embodiment, the mineral complex and compositions comprising the mineral complex are applied onto a solid or liquid surface (e.g., soil, vegetation, or water) in liquid form by spraying. Similar methods may be employed to apply liquid formulations comprising binder, seed, mulch, fertilizing agent, or any combination thereof.

The mineral complex and compositions comprising the mineral complex also may be applied from the air using any method known in the art, such as a crop-duster, a helicopter, or a cargo plane; from the ground using any method known in the art, such as a dump truck, a conventional spreader, or a conventional sprayer; or from the water, using any method known in the art, such as a barge or boat.

When the mineral complex and compositions comprising the mineral complex, as described herein, are applied to land, such as for purposes of augmenting or remediating a solid growth medium, such as soil or vegetation, or preventing or mitigating erosion of soil, as described herein, the mineral complex, or composition thereof, that may be applied is an amount sufficient to provide for application of the desired amount of mineral complex thereto. For example, the mineral complex is applied in an amount ranging from about 200 lbs per acre and about 10,000 lbs per acre (e.g., about 200 to about 10,000 lbs per acre, about 200 to about 9,000 lbs per acre, about 200 to about 8,000 lbs per acre, about 200 to about 7,000 lbs per acre, about 200 to about 6,000 lbs per acre, about 200 to about 5,000 lbs per acre, about 200 to about 4,000 lbs per acre, about 200 to about 3,000 lbs per acre, about 200 to about 2,000 lbs per acre, about 200 to about 1,000 lbs per acre, about 200 to about 900 lbs per acre, about 200 to about 800 lbs per acre, about 200 to about 700 lbs per acre, about 200 to about 600 lbs per acre, about 300 to about 500 lbs per acre, about 300 to about 400 lbs per acre, about 400 to about 6,000 lbs per acre, about 500 to about 5,000 lbs per acre, about 600 to about 4,000 lbs per acre, about 700 to about 3,000 lbs per acre, about 800 to about 2,000 lbs per acre, or about 900 lbs per acre, about 1,000 lbs per acre, about 2,000 lbs per acre, or about 3,000 lbs per acre). Preferably, the amount of mineral complex, whether applied alone or as part of a composition, is applied at about 250 lbs to about 5000 lbs per acre (e.g., about 250 lbs, about 300 lbs, about 350 lbs, about 400 lbs, about 450 lbs, about 500 lbs, about 550 lbs, about 600 lbs, about 650 lbs, about 700 lbs, about 750 lbs, about 800 lbs, about 850 lbs, about 900 lbs, about 950 lbs, about 1000 lbs, about 1500 lbs, about 2000 lbs, about 2500 lbs, about 3000 lbs, about 3500, about 4000 lbs, about 4500 lbs, or about 5000 lbs per acre), more preferably at about 200 lbs to about 3,000 lbs per acre, and more preferably at about 1,000 lbs to about 3,000 lbs per acre.

When the mineral complex and compositions comprising the mineral complex, as described herein, are applied to water, such as for purposes of augmenting a growth medium comprising water (e.g., in hydroponics) or remediating contaminated water, as described herein, the mineral complex, or composition thereof, is applied in an amount sufficient to provide for the application of the mineral complex in an amount of from about 25 lbs and about 5000 lbs of the mineral complex per 5,000 square feet of surface area of water (e.g., about 25 lbs, about 50 lbs, about 100 lbs, about 150 lbs, about 200 lbs, about 250 lbs, about 300 lbs, about 350 lbs, about 400 lbs, about 450 lbs, about 500 lbs, about 550 lbs, about 600 lbs, about 650 lbs, about 700 lbs, about 750 lbs, about 800 lbs, about 850 lbs, about 900 lbs, about 950 lbs, about 1,000 lbs, about 1,500 lbs, about 2,000 lbs, about 2,500 lbs, about 3,000 lbs, about 3,500 lbs, about 4,000 lbs, or about 4,500 lbs per 5,000 square feet of surface area of water). Preferably, the amount of mineral complex, whether applied alone or as part of a composition, is applied onto the water at from about 50 lbs and about 500 lbs of the mineral complex per 5,000 square feet of surface area of water.

The following examples further illustrate the invention but, of course, should not be construed as in any way limiting its scope.

Example 1

This example demonstrates the chemical analysis of several different mineral complexes.

Two mineral complexes (complex 1 and complex 2) were obtained from a natural mineral source and crushed/milled to a particle size of 200 to 400 mesh (a fine dust). A chemical analysis was used to determine the components of each mineral complex, as set forth in Table 3. A third mineral complex (complex 3) was prepared by mixing 95 wt. % of complex 1 with 5 wt. % of complex 2. A fourth mineral complex (complex 4) was prepared by mixing 85 wt. % of complex 1 with 15 wt. % of complex 2.

TABLE 3

|  | Complex 1 | Complex 2 | Complex 3 | Complex 4 |
|---|---|---|---|---|
| $SiO_2$ | 47.6% | 65.9% | 48.52% | 50.35% |
| $Al_2O_3$ | 14.75% | 11.5% | 14.59% | 14.26% |
| $Fe_2O_3$ | 13.6% | 1.41% | 12.99% | 11.77% |
| CaO | 9.01% | 3.75% | 8.75% | 8.22% |
| MgO | 6.36% | 0.81% | 6.08% | 5.53% |
| $Na_2O$ | 2.6% | 2.11% | 2.58% | 2.53% |
| $K_2O$ | 0.72% | 5.25% | 0.95% | 1.40% |
| $Cr_2O_3$ | 0.02% | <0.01% | 0.02% | 0.02% |
| $TiO_2$ | 1.59% | 0.2% | 1.52% | 1.38% |
| MnO | 0.19% | 0.02% | 0.18% | 0.16% |
| $P_2O_5$ | 0.2% | 0.15% | 0.20% | 0.19% |
| SrO | 0.03% | 0.03% | 0.03% | 0.03% |
| BaO | 0.02% | 0.09% | 0.02% | 0.03% |
| C | 0.04% | 0.62% | 0.07% | 0.13% |
| S | <0.01% | 0.025% | <0.01% | <0.01% |
| Ag | <1 ppm | <1 ppm | <1 ppm | <1 ppm |
| Ba | 199 ppm | 450 ppm | 211.55 ppm | 236.65 ppm |
| Ce | 32 ppm | 220 ppm | 41.4 ppm | 60.20 ppm |
| Co | 58 ppm | 21 ppm | 56.15 ppm | 52.45 ppm |
| Cr | 170 ppm | 6 ppm | 161.80 ppm | 145.40 ppm |
| Cs | 0.72 ppm | 22 ppm | 1.78 ppm | 3.91 ppm |
| Cu | 190 ppm | 12 ppm | 181.10 ppm | 163.30 ppm |
| Dy | 5.63 ppm | 2.5 ppm | 5.47 ppm | 5.16 ppm |

TABLE 3-continued

|    | Complex 1 | Complex 2 | Complex 3 | Complex 4 |
|----|-----------|-----------|-----------|-----------|
| Er | 3.21 ppm  | 1.7 ppm   | 3.13 ppm  | 2.98 ppm  |
| Eu | 1.79 ppm  | 3.7 ppm   | 1.89 ppm  | 2.08 ppm  |
| Ga | 24.2 ppm  | 15 ppm    | 23.74 ppm | 22.82 ppm |
| Gd | 5.56 ppm  | 3.7 ppm   | 5.47 ppm  | 5.28 ppm  |
| Hf | 3.9 ppm   | 21 ppm    | 4.76 ppm  | 6.47 ppm  |
| Ho | 1.06 ppm  | 0.6 ppm   | 1.04 ppm  | 0.99 ppm  |
| La | 14.6 ppm  | 220 ppm   | 24.87 ppm | 45.41 ppm |
| Lu | 0.43 ppm  | 0.5 ppm   | 0.43 ppm  | 0.44 ppm  |
| Mo | 3 ppm     | 12.5 ppm  | 3.48 ppm  | 4.43 ppm  |
| Nb | 8.6 ppm   | 40 ppm    | 10.17 ppm | 13.31 ppm |
| Nd | 20.6 ppm  | 5 ppm     | 19.82 ppm | 18.26 ppm |
| Ni | 105 ppm   | 2.5 ppm   | 99.88 ppm | 89.63 ppm |
| Pb | 5 ppm     | 6 ppm     | 5.05 ppm  | 5.15 ppm  |
| Pr | 4.71 ppm  | 27 ppm    | 5.82 ppm  | 8.05 ppm  |
| Rb | 17.2 ppm  | 325 ppm   | 32.59 ppm | 63.37 ppm |
| Sm | 4.9 ppm   | 6.2 ppm   | 4.97 ppm  | 5.10 ppm  |
| Sn | 1 ppm     | 3 ppm     | 1.10 ppm  | 1.30 ppm  |
| Sr | 244 ppm   | 380 ppm   | 250.80 ppm| 264.40 ppm|
| Ta | 0.6 ppm   | 2.8 ppm   | 0.71 ppm  | 0.93 ppm  |
| Tb | 0.89 ppm  | 0.8 ppm   | 0.89 ppm  | 0.88 ppm  |
| Th | 1.73 ppm  | 180 ppm   | 10.64 ppm | 28.47 ppm |
| Tl | <0.5 ppm  | 6 ppm     | <0.78 ppm | <1.33 ppm |
| Tm | 0.45 ppm  | 0.6 ppm   | 0.46 ppm  | 0.47 ppm  |
| U  | 0.48 ppm  | 6 ppm     | 0.76 ppm  | 1.31 ppm  |
| V  | 271 ppm   | 7.8 ppm   | 257.84 ppm| 231.52 ppm|
| W  | 1 ppm     | 26 ppm    | 2.25 ppm  | 4.75 ppm  |
| Y  | 29.2 ppm  | 23 ppm    | 28.89 ppm | 28.27 ppm |
| Yb | 2.93 ppm  | 1.4 ppm   | 2.85 ppm  | 2.70 ppm  |
| Zn | 135 ppm   | 64 ppm    | 131.45 ppm| 124.35 ppm|
| Zr | 138 ppm   | 63 ppm    | 134.25 ppm| 126.75 ppm|
| As | 0.8 ppm   | 1.1 ppm   | 0.82 ppm  | 0.85 ppm  |
| Bi | 0.01 ppm  | 3.5 ppm   | 0.18 ppm  | 0.53 ppm  |
| Hg | <0.005 ppm| 0.01 ppm  | <0.005 ppm| <0.006 ppm|
| Sb | 0.06 ppm  | 0.4 ppm   | 0.08 ppm  | 0.11 ppm  |
| Se | 0.6 ppm   | 0.7 ppm   | 0.61 ppm  | 0.62 ppm  |
| Te | <0.01 ppm | 0.022 ppm | <0.01 ppm | <0.01 ppm |
| LOI| 2.76%     | 6.45%     | 2.94%     | 3.31%     |

The silicon dioxide content of mineral complex 2 falls outside of the scope of the mineral complex described herein. However, mineral complex 2 was successfully combined with mineral complex 1 to prepare mineral complexes 3 and 4. Mineral complexes 1, 3, and 4 fall within the scope of the invention described herein. Additional mineral complexes falling within the scope of the invention described herein can be prepared using mineral complexes 1 and 2. This example demonstrates the specific components of three exemplary mineral complexes of the invention that may be used as a soil amendment.

Example 2

This examples demonstrates methods for augmenting growth media, enhancing moisture retention in soil, and enhancing seed germination using the mineral complex of the present invention.

A ten week study was initiated in August 2010 on a sandy loam soil located at the Louisiana State University Agricultural Center Burden Facility in Baton Rouge, La. Plots (3×3 ft) were arranged in randomized complete block design with four replications. The plots were treated at 0 and 4 weeks with a nitrogen source ($NH_4NO_3$) at a rate of 0, 0.25. 0.5, or 1.0 pounds of the nitrogen source per 1,000 square feet (lbs N/M), either alone (as a control) or in combination with a mineral complex comprising a mixture of 96 wt. % of complex 1, as described in Example 1 (see Table 3) and 4 wt. % of complex 2, as described in Example 1 (see Table 3).

The treatment conditions for the control and mineral complex treated plots are shown in Table 4.

TABLE 4

| Treatment Group | Rate of Mineral Complex Application lbs/acre | N Source | Fertilizer Analysis (N—P—K) | Rates of Nitrogen Application lbs N/M | Nitrogen Application Frequency |
|---|---|---|---|---|---|
| Control | NA | $NH_4NO_3$ | 34-0-0 | 0, 0.25, 0.5 and 1.0 | 0 and 4 weeks |
| Mineral Complex | 2000 | $NH_4NO_3$ | 34-0-0 | 0, 0.25, 0.5 and 1.0 | 0 and 4 weeks |

Common bermudagrass was seeded at 200 lbs of pure live seed per acre (PLS/A) to the entire treatment area followed by application of a mineral complex comprising a mixture of 96 wt. % of complex 1, as described in Example 1 (see Table 3), and 4 wt. % of complex 2, as described in Example 1 (see Table 3), at 2000 lbs/acre to half the plots using shakers for more even distribution across the soil surface. Nitrogen applications were applied using a 3 ft wide drop spreader at the initiation of the trial and 4 weeks after seeding. Plots were irrigated within twenty-four hours after mineral complex and nitrogen fertilizer applications and as needed throughout the trial. During the first 14 days, seed emergence was recorded daily. Canopy coverage on a scale of 0% to 100% (0%=bare soil and 100%=complete grass coverage) was visually assessed every 2 weeks for 10 weeks. During the first 60 days of the trial, soil water content (v/v) was measured using the EC-5 probe with data recorded on the ECHO-5 datalogger (Decagon Inc., Pulham, Wash.). This measurement was only recorded for treatments receiving the 1 lbs N/M application rate.

At the conclusion of the trial, soil cores were collected from each treatment using a hammer probe core sampler (6.3 cm×15 cm, AMS INC., American Falls, Id.) to a depth of 6 inches. Roots were washed to remove soil and debris in preparation for analysis using the WinRhizo System (Regent Systems Inc., Quebec, Canada). The WinRhizo System is an image analysis program designed to measure root architectural parameters such as total root length and surface area. Root samples were scanned at 400 dots per inch (Epson 1680, Epson America Inc, Long Beach, Calif.) and analyzed using WinRHIZO image analysis software. Root analysis procedures followed previously published methods of Costa et al (2001) and Bouma et al. (2000). Prior to scanning, root sample preparation included immersion in a 1% (v/v) methylene blue solution for 15 min followed by de-ionized water washes to remove excess dye. All data was analyzed as RCBD using SAS statistical software. Means were separated using Fisher's protected least significant difference ($\alpha=0.05$)

Common bermudagrass seed emergence occurred within the first 14 days of the trial, as shown in Table 5. Environmental conditions were extremely favorable for common bermudagrass seed germination, as shown in Table 6. Although, statistically, the only significant improvement in common bermudagrass seed emergence occurred at the highest nitrogen application rate (1.0 lbs N/M) and mineral complex treatment group, seeds emerged several days earlier in all of the mineral complex treatment groups (i.e., across all nitrogen application rates) as compared to the matched controls. Specifically, seeds emerged between 5 and 7 days in plots treated with the mineral complex compared to 8 to 10 days for the controls (treated with nitrogen only) (see Table 5).

TABLE 5

Effect of the Mineral Complex on Common Bermudagrass Seed Emerence.

| Treatment | Nitrogen Rate (lbs N/M) | Seed Emergence (days) |
|---|---|---|
| Control | 0 | 9.3 |
|  | 0.25 | 8.8 |
|  | 0.50 | 10.0 |
|  | 1.00 | 8.5 |
| Mineral Complex | 0 | 7.5 |
|  | 0.25 | 6.5 |
|  | 0.50 | 7.0 |
|  | 1.00 | 5.8 |
| LSD$_{(\alpha=0.05)}$ |  | 3.3 |

LSD = Fisher's least significant difference

TABLE 6

Environmental Conditions During Common Bermudagrass Establishment

| Average High Temperature (° F.) | Average Low Temperature (° F.) | Total Precipitation (inches) | Average High Soil Temperature (° F.) | Average Low Soil Temperature (° F.) |
|---|---|---|---|---|
| 88.2 | 67.1 | 12.82 | 94.6 | 70.6 |

Based on soil water content measurements of the 1.0 lbs N/M application rate for mineral complex and control plots, it was also observed that the mineral complex-treated soil maintained a higher soil water content during the first 3 weeks after seeding (see FIG. 1). Increased soil moisture is generally believed to provide a more conducive soil environment for seedling germination.

The slight acceleration in common bermudagrass seed emergence also had a positive effect on increasing groundcover for the 1.0 lbs N/M application rate and mineral complex treatment (see Table 7). During the first 2 weeks after seeding, nitrogen application rates of 0.5 lbs N/M or less exhibited <1% ground cover for both treatments with the exception of nitrogen application rate of 0.5 lbs N/M and the mineral complex, which exhibited a ground cover of 2.5%. In subsequent weeks, all treatments had increased ground cover, with higher nitrogen application rates having the highest coverages. As nitrogen application rates were reduced, common bermudagrass ground cover declined with the exception of mineral complex and the 0.5 lbs N/M rate. At 8 weeks after seeding, treatments of 0.5 lbs N/M had 60.8% and 76.2% ground cover for control and mineral complex, respectively.

TABLE 7

Effect of Mineral Complex on Common Bermudagrass Establishment

| Treatment | Nitrogen Rate (lbs N/M) | Bermudagrass Cover (%) | | | | |
|---|---|---|---|---|---|---|
|  |  | 2 | 4 | 6 | 8 | 10 |
| Control | 0 | <1 | 9.8 | 15.5 | 30.3 | 44.5 |
|  | 0.25 | <1 | 10.5 | 23.3 | 41.6 | 68.3 |
|  | 0.50 | <1 | 18.8 | 39.3 | 60.8 | 86.5 |
|  | 1.00 | 3.0 | 19.5 | 47.8 | 80.5 | 97.5 |
| Mineral Complex | 0 | <1 | 8.0 | 13.3 | 28.0 | 46.8 |
|  | 0.25 | <1 | 12.5 | 28.8 | 46.5 | 72.8 |

TABLE 7-continued

Effect of Mineral Complex on Common Bermudagrass Establishment

| Treatment | Nitrogen Rate (lbs N/M) | Bermudagrass Cover (%) | | | | |
|---|---|---|---|---|---|---|
|  |  | 2 | 4 | 6 | 8 | 10 |
|  | 0.50 | 2.5 | 19.3 | 46.8 | 76.2 | 96.5 |
|  | 1.00 | 6.0 | 22.8 | 49.5 | 83.8 | 95.0 |
| LSD$_{(\alpha=0.05)}$ |  | 2.1 | 5.7 | 12.2 | 13.7 | 16.5 |

LSD = Fisher's least significant difference

Figure 2:
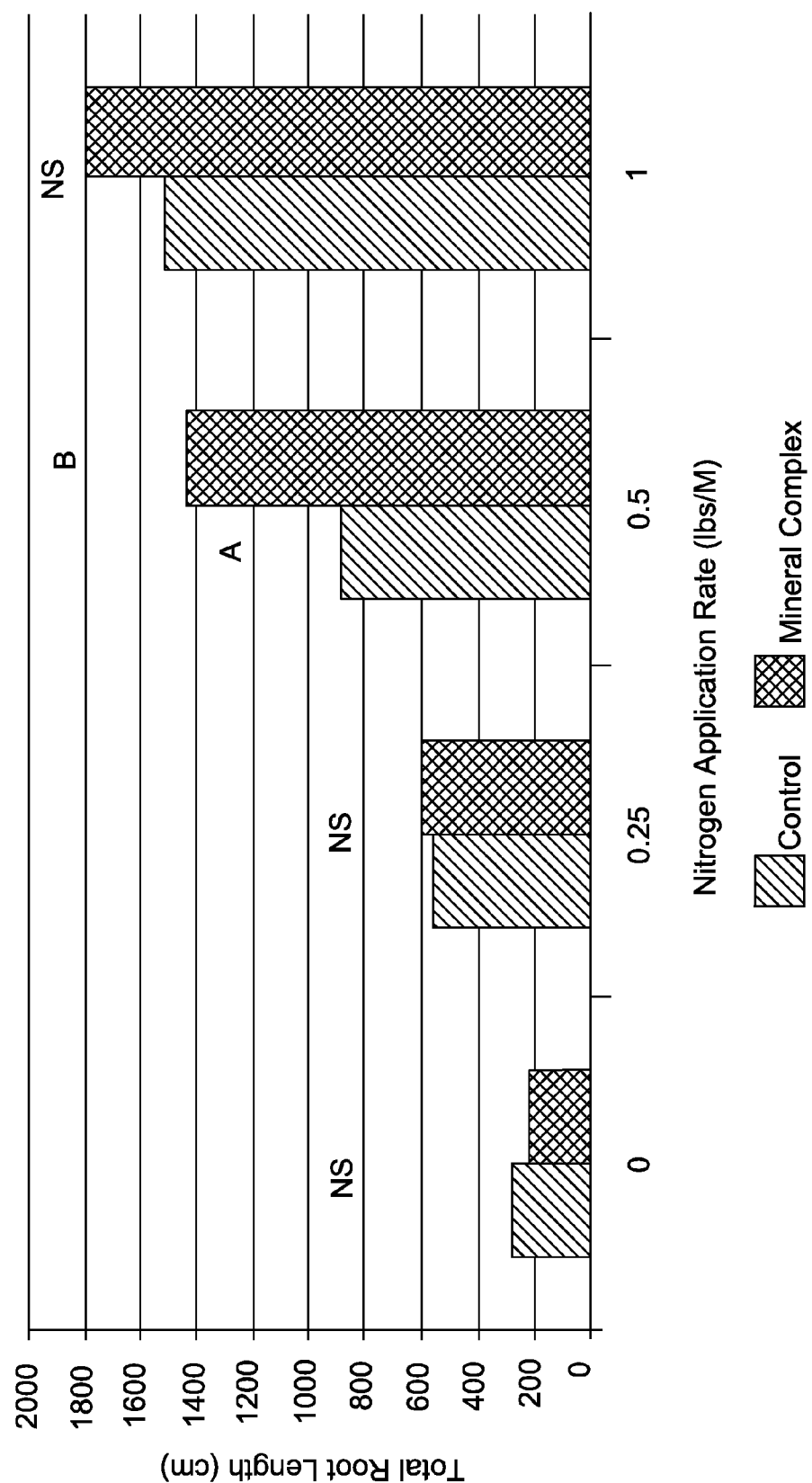
FIG. 2 is a bar graph depicting the total root length (cm) for common bermudagrass grown in soil treated with various application rates of nitrogen (control) and soil treated with various application rate of nitrogen and the mineral complex (mineral complex).

As shown in FIGS. 2 and 3, total root length and surface area increased for both treatments as the nitrogen application rates increased. Common bermudagrass that received no nitrogen resulted in the lowest total root length and surface areas. The mineral complex appeared in this study to had relatively no effect on rooting at nitrogen application rates of 0, 0.25 and 1.0 lbs N/M compared to controls at the same nitrogen application rates for total root length. However, the combination of the mineral complex and a nitrogen application rate of 0.5 lbs N/M resulted in higher total root length and surface area compared to controls at a nitrogen application rate of 0.5 lbs N/M, and were similar to controls at 1.0 lbs N/M (see FIGS. 2 and 3).

The results of the experiments reflected in this example appear to demonstrate that the need for nitrogen application may be reduced from the rate of 1.0 lbs N/M, the rate that is commonly applied during common bermudagrass establishment, by the application of a mineral complex of the invention, namely, a mineral complex comprising 96 wt. % complex 1 set forth in Table 3 and 4 wt. % complex 2 set forth in Table 3 at a rate of 2000 lbs/acre. Common bermudagrass established using the mineral complex and a nitrogen application rate of 0.5 lbs N/M exhibited a similar pattern in ground cover and root development as the 1 lbs N/M controls. It is believed that the ability of the mineral complex to enhance bermudagrass establishment may be due in part to its ability to maintain higher soil water content. By increasing soil water content, it is further believed that common bermudagrass is capable of developing a stronger root system that is more effective at nitrogen uptake, resulting in better plant growth. Because water is often a limiting factor that negatively affects vegetation establishment, maintenance of higher soil water content is believed to be beneficial during grass establishment.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A composition comprising a binder and a mineral complex, wherein the mineral complex consists essentially of a natural volcanic mineral deposit comprising 47 wt. % to about 54 wt. % $SiO_2$, about 9 wt. % to about 15 wt. % $Fe_2O_3$, about 6 wt. % to about 10 wt. % CaO, about 4 wt. % to about 7 wt. % MgO, about 12 wt. % to about 15 wt. % $Al_2O_3$, about 1 wt. % to about 4 wt. % $Na_2O$, about 0.01 wt. % to about 3 wt. % $K_2O$, about 0.01 wt. % to about 0.03 wt. % $Cr_2O_3$, about 1.0 wt. % to about 2.0 wt. % $TiO_2$, about 0.1 wt. % to about 0.3 wt. % MnO, about 0.1 wt. % to about 0.3 wt. % $P_2O_5$, about 0.01 wt. % to about 0.05 wt. % SrO, and about 0.01 wt. % to about 2 wt. % BaO, and wherein the mineral complex further comprises one or more of Ag, Ba, Co, Cr, Cs, Cu, Ga, Hf, Mo, Nb, Ni, Rb, Sn, Sr, Ta, Th, Tl, V, W, Zn, and Zr in the ranges set forth in Table 1

TABLE 1

| Element | Range (ppm based on total weight of mineral complex) |
|---|---|
| Ag | about 0.0001 ppm to about 10 ppm |
| Ba | about 1 ppm to about 500 ppm |
| Co | about 0.01 ppm to about 200 ppm |
| Cr | about 1 ppm to about 400 ppm |
| Cs | about 0.0001 ppm to about 50 ppm |
| Cu | about 1 ppm to about 400 ppm |
| Ga | about 0.001 ppm to about 200 ppm |
| Hf | about 0.001 ppm to about 50 ppm |
| Mo | about 0.001 ppm to about 25 ppm |
| Nb | about 0.001 ppm to about 100 ppm |
| Ni | about 1 ppm to about 400 ppm |
| Rb | about 1 ppm to about 400 ppm |
| Sn | about 0.0001 ppm to about 15 ppm |
| Sr | about 1 ppm to about 600 ppm |
| Ta | about 0.0001 ppm to about 10 ppm |
| Th | about 0.001 ppm to about 200 ppm |
| Tl | about 0.0001 ppm to about 25 ppm |
| V | about 1 ppm to about 600 ppm |
| W | about 0.0001 ppm to about 25 ppm |
| Zn | about 1 ppm to about 400 ppm |
| Zr | about 1 ppm to about 400 ppm | and one or more of Bi, Hg, Se, and Te in the ranges set forth in Table 2

TABLE 2

| Element | Range (ppm based on total weight of mineral complex) |
|---|---|
| Bi | about 0.0001 ppm to about 4 ppm |
| Hg | about 0.00001 ppm to about 0.5 ppm |
| Se | about 0.0001 ppm to about 4 ppm |
| Te | about 0.0001 ppm to about 2 ppm | wherein, in the mineral complex, As is present in an amount less than 5 ppm, Sb is present in an amount less than 2 ppm, Pb is present in an amount of 5.15 ppm or less, and U is present in an amount of 1.31 ppm or less.

2. The composition of claim 1, wherein the binder is an organic material.

3. The composition of claim 1, wherein at least about 85% of the mineral complex has an average particle size from about 10 to about 6-000 mesh.

4. The composition of claim 1, wherein the composition is in the form of at least one pellet.

5. The composition of claim 4, wherein the pellet has an average diameter of from about 0.1 mm to about 10 mm.

6. The composition of claim 1, wherein the composition is in the form of a plurality of pellets.

7. The composition of claim 6, wherein each pellet has an average diameter of from about 0.1 mm to about 10 mm.

8. The composition of claim 1, wherein the binder provides for the extended release of mineral complex from the composition when the composition is exposed to a water-containing environment.

9. The composition of claim 1, wherein the binder is selected from at least one of the group consisting of sulfur, wax, polymer, oil, urea-formaldehyde, plant starches, protein gels, glues, gumming compositions, humic, crystallizing compounds, gelling clays, synthetic gel-forming compounds, and mixtures thereof.

10. The composition of claim 1, wherein the mineral complex is present in the composition in an amount ranging from about 50 wt. % to about 99.5 wt. % of the composition.

11. The composition of claim 1, wherein the composition further comprises a fertilizing agent.

12. The composition of claim 11, wherein the composition further comprises mulch.

13. The composition of claim 1, wherein the composition further comprises mulch.

14. The composition of claim 1, wherein the composition is in the form of a plurality of pellets, wherein each pellet has an average diameter of from about 0.1 mm to about 10 mm.

15. The composition of claim 14, wherein the binder provides for the extended release of mineral complex from the composition when the composition is exposed to a water-containing environment.

16. A composition comprising a fertilizing agent and a mineral complex, wherein the mineral complex consists essentially of a natural volcanic mineral deposit comprising 47 wt. % to about 54 wt. % $SiO_2$, about 9 wt. % to about 15 wt. % $Fe_2O_3$, about 6 wt. % to about 10 wt. % CaO, about 4 wt. % to about 7 wt. % MgO, about 12 wt. % to about 15 wt. % $Al_2O_3$, about 1 wt. % to about 4 wt. % $Na_2O$, about 0.01 wt. % to about 3 wt. % $K_2O$, about 0.01 wt. % to about 0.03 wt. % $Cr_2O_3$, about 1.0 wt. % to about 2.0 wt. % $TiO_2$, about 0.1 wt. % to about 0.3 wt. % MnO, about 0.1 wt. % to about 0.3 wt. % $P_2O_5$, about 0.01 wt. % to about 0.05 wt. % SrO, and about 0.01 wt. % to about 2 wt. % BaO, wherein the mineral complex further comprises one or more of Ag, Ba, Co, Cr, Cs, Cu, Ga, Hf, Mo, Nb, Ni, Rb, Sn, Sr, Ta, Th, Tl, V, W, Zn, and Zr in the ranges set forth in Table 1

TABLE 1

| Element | Range (ppm based on total weight of mineral complex) |
|---|---|
| Ag | about 0.0001 ppm to about 10 ppm |
| Ba | about 1 ppm to about 500 ppm |
| Co | about 0.01 ppm to about 200 ppm |
| Cr | about 1 ppm to about 400 ppm |
| Cs | about 0.0001 ppm to about 50 ppm |
| Cu | about 1 ppm to about 400 ppm |
| Ga | about 0.001 ppm to about 200 ppm |
| Hf | about 0.001 ppm to about 50 ppm |
| Mo | about 0.001 ppm to about 25 ppm |
| Nb | about 0.001 ppm to about 100 ppm |
| Ni | about 1 ppm to about 400 ppm |
| Rb | about 1 ppm to about 400 ppm |
| Sn | about 0.0001 ppm to about 15 ppm |
| Sr | about 1 ppm to about 600 ppm |
| Ta | about 0.0001 ppm to about 10 ppm |
| Th | about 0.001 ppm to about 200 ppm |
| Tl | about 0.0001 ppm to about 25 ppm |
| V | about 1 ppm to about 600 ppm |
| W | about 0.0001 ppm to about 25 ppm |
| Zn | about 1 ppm to about 400 ppm |
| Zr | about 1 ppm to about 400 ppm | and one or more of Bi, Hg, Se, and Te in the ranges set forth in Table 2

TABLE 2

| Element | Range (ppm based on total weight of mineral complex) |
|---|---|
| Bi | about 0.0001 ppm to about 4 ppm |
| Hg | about 0.00001 ppm to about 0.5 ppm |
| Se | about 0.0001 ppm to about 4 ppm |
| Te | about 0.0001 ppm to about 2 ppm | wherein, in the mineral complex, As is present in an amount less than 5 ppm, Sb is present in an amount less than 2 ppm, Pb is present in an amount of 5.15 ppm or less, and U is present in an amount of 1.31 ppm or less.

17. The composition of claim 16, wherein the fertilizing agent is an inorganic fertilizing agent.

18. The composition of claim 17, wherein the inorganic fertilizing agent is selected from the group consisting of nitrogen, phosphorus, potassium, and mixtures thereof.

19. The composition of claim 16, wherein the fertilizing agent is an organic fertilizing agent.

20. The composition of claim 19, wherein the organic fertilizing agent is selected from the group consisting of manure, worm castings, compost, seaweed, humic, guano, brassin, peat moss, and mixtures thereof.

21. The composition of claim 16, wherein the mineral complex is present in the composition in an amount ranging from about 0.1 wt. % to about 99.5 wt. % of the composition.

22. The composition of claim 21, wherein the mineral complex is present in the composition in an amount ranging from about 10 wt. % to about 70 wt. % of the composition.

23. The composition of claim 16, wherein at least about 85% of the mineral complex has an average particle size of from about 10 to about 6000 mesh.

24. The composition of claim 16, wherein the composition is in the form of at least one pellet.

25. The composition of claim 24, wherein the pellet has an average diameter of from about 0.1 mm to about 10 mm.

26. The composition of claim 16, wherein the composition is in the form of a plurality of pellets.

27. The composition of claim 26, wherein each pellet has an average diameter of from about 0.1 mm to about 10 mm.

28. The composition of claim 16, wherein the composition further comprises a medium in which the fertilizing agent and the mineral complex are enclosed, wherein the medium provides for the controlled release of the fertilizing agent and the mineral complex from the medium when the medium is exposed to a water-containing environment.

29. The composition of claim 28, wherein the medium comprises a cellulosic material.

30. The composition of claim 28, wherein the medium comprises a perforated membrane.

31. The composition of claim 16, wherein the composition is in the form of a plurality of pellets, wherein each pellet has an average diameter of from about 0.1 mm to about 10 mm.

32. A composition comprising mulch and a mineral complex, wherein the mineral complex consists essentially of a natural volcanic mineral deposit comprising 47 wt. % to about 54 wt. % $SiO_2$, about 9 wt. % to about 15 wt. % $Fe_2O_3$, about 6 wt. % to about 10 wt. % CaO, about 4 wt. % to about 7 wt. % MgO, 12 wt. % to about 15 wt. % $Al_2O_3$, about 1 wt. % to about 4 wt. % $Na_2O$, about 0.01 wt. % to about 3 wt. % $K_2O$, about 0.01 wt. % to about 0.03 wt. % $Cr_2O_3$, about 1.0 wt. % to about 2.0 wt. % $TiO_2$, about 0.1 wt. % to about 0.3 wt. % MnO, about 0.1 wt. % to about 0.3 wt. % $P_2O_5$, about 0.01 wt. % to about 0.05 wt. % SrO, and about 0.01 wt. % to about 2 wt. % BaO, and wherein the mineral complex further comprises one or more of Ag, Ba, Co, Cr, Cs, Cu, Ga, Hf, Mo, Nb, Ni, Rb, Sn, Sr, Ta, Th, Tl, V, W, Zn, and Zr in the ranges set forth in Table 1

TABLE 1

| Element | Range (ppm based on total weight of mineral complex) |
|---|---|
| Ag | about 0.0001 ppm to about 10 ppm |
| Ba | about 1 ppm to about 500 ppm |
| Co | about 0.01 ppm to about 200 ppm |
| Cr | about 1 ppm to about 400 ppm |
| Cs | about 0.0001 ppm to about 50 ppm |
| Cu | about 1 ppm to about 400 ppm |
| Ga | about 0.001 ppm to about 200 ppm |
| Hf | about 0.001 ppm to about 50 ppm |
| Mo | about 0.001 ppm to about 25 ppm |
| Nb | about 0.001 ppm to about 100 ppm |
| Ni | about 1 ppm to about 400 ppm |
| Rb | about 1 ppm to about 400 ppm |
| Sn | about 0.0001 ppm to about 15 ppm |
| Sr | about 1 ppm to about 600 ppm |
| Ta | about 0.0001 ppm to about 10 ppm |
| Th | about 0.001 ppm to about 200 ppm |
| Tl | about 0.0001 ppm to about 25 ppm |
| V | about 1 ppm to about 600 ppm |
| W | about 0.0001 ppm to about 25 ppm |
| Zn | about 1 ppm to about 400 ppm |
| Zr | about 1 ppm to about 400 ppm | and one or more of Bi, Hg, Se, and Te in the ranges set forth in Table 2

TABLE 2

| Element | Range (ppm based on total weight of mineral complex) |
|---|---|
| Bi | about 0.0001 ppm to about 4 ppm |
| Hg | about 0.00001 ppm to about 0.5 ppm |

TABLE 2-continued

| Element | Range (ppm based on total weight of mineral complex) |
|---|---|
| Se | about 0.0001 ppm to about 4 ppm |
| Te | about 0.0001 ppm to about 2 ppm | wherein, in the mineral complex, As is present in an amount less than 5 ppm, Sb is present in an amount less than 2 ppm, Pb is present in an amount of 5.15 ppm or less, and U is present in an amount of 1.31 ppm or less.

33. The composition of claim 32, wherein the mulch is an inorganic mulch.

34. The composition of claim 33, wherein the inorganic mulch is selected from the group consisting of rubber, plastic, rock, gravel, and mixtures thereof.

35. The composition of claim 32, wherein the mulch is an organic mulch.

36. The composition of claim 35, wherein the organic mulch is selected from the group consisting of leaves, hay, straw, bark, sawdust, wood chips, paper, and mixtures thereof.

37. The composition of claim 32, wherein the mineral complex is present in the composition in an amount ranging from about 0.1 wt. % to about 99.5 wt. % of the composition.

38. The composition of claim 37, wherein the mineral complex is present in the composition in an amount ranging from about 10 wt. % to about 50 wt. % of the composition.

39. The composition of claim 32, wherein at least about 85% of the mineral complex has an average particle size from about 10 to about 6-000 mesh.

40. The composition of claim 32, wherein the composition is provided in the form of a pellet, and wherein the pellet comprises a binder and the mineral complex.

41. The composition of claim 40, wherein the pellet has an average diameter of from about 0.1 mm to about 10 mm.

42. The composition of claim 32, wherein the composition is provided in the form of a plurality of pellets, and wherein each pellet comprises a binder and the mineral complex.

43. The composition of claim 42, wherein each pellet has an average diameter of from about 0.1 mm to about 10 mm.

44. The composition of claim 32, wherein the composition further comprises a medium in which the mineral complex is enclosed, wherein the medium provides for the controlled release of the mineral complex from the medium when the medium is exposed to a water-containing environment.

45. The composition of claim 44, wherein the medium comprises a cellulosic material.

46. The composition of claim 44, wherein the medium comprises a perforated membrane.

47. The composition of claim 32, wherein the composition further comprises a binder, the composition is provided in the form of a plurality of pellets.

48. The composition of claim 47, wherein each pellet has an average diameter of from about 0.1 mm to about 10 mm.

* * * * *